United States Patent
Lee et al.

(10) Patent No.: US 12,015,574 B2
(45) Date of Patent: Jun. 18, 2024

(54) METHOD AND DEVICE FOR TRANSMITTING PSCCH AND PSSCH

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 437 days.

(21) Appl. No.: 17/600,037

(22) PCT Filed: Apr. 2, 2020

(86) PCT No.: PCT/KR2020/004535
§ 371 (c)(1),
(2) Date: Sep. 29, 2021

(87) PCT Pub. No.: WO2020/204642
PCT Pub. Date: Oct. 8, 2020

(65) Prior Publication Data
US 2022/0190984 A1 Jun. 16, 2022

Related U.S. Application Data

(60) Provisional application No. 62/828,446, filed on Apr. 2, 2019.

(51) Int. Cl.
*H04L 5/00* (2006.01)
*H04W 72/20* (2023.01)
*H04W 72/0453* (2023.01)

(52) U.S. Cl.
CPC .......... *H04L 5/0048* (2013.01); *H04W 72/20* (2023.01); *H04W 72/0453* (2013.01)

(58) Field of Classification Search
CPC ... H04L 5/0048; H04L 5/0053; H04L 5/0051; H04L 1/0026; H04L 1/0031; H04W 72/0453; H04W 72/20
See application file for complete search history.

(56) References Cited

U.S. PATENT DOCUMENTS 11,582,723 B2 * 2/2023 Lee ............... H04L 5/0051
2017/0094657 A1 3/2017 Yoon
(Continued)

OTHER PUBLICATIONS

Ericsson, "Physical layer structure for SL NR V2X", R1-1813638, 3GPP TSG-RAN WG1, Meeting #95, Spokane, WA, US, Nov. 12-16, 2018, see sections 5-7.1; and figures 3-4.
(Continued)

*Primary Examiner* — Stephen J Clawson
(74) *Attorney, Agent, or Firm* — BRYAN CAVE LEIGHTON PAISNER LLP

(57) ABSTRACT

Provided, according to one embodiment of the present disclosure, is a method for a first device transmitting a PSCCH and a PSSCH to a second device. The method may comprise the steps of: determining whether, in the entire frequency band of one PSSCH sub-channel, a first DMRS symbol is occupied by a resource region associated with a PSCCH; on the basis of whether the first DMRS symbol is occupied by the resource region associated with the PSCCH, determining a position, of a reference symbol in a PSSCH resource, in which a second SCI is mapped; mapping the second SCI on the basis of the position of the reference symbol in the PSSCH resource; and transmitting the second SCI to a second device via the PSSCH.

13 Claims, 24 Drawing Sheets

(56) References Cited

U.S. PATENT DOCUMENTS

| | | | |
|---|---|---|---|
| 2020/0106566 A1* | 4/2020 | Yeo | H04W 28/04 |
| 2020/0314804 A1* | 10/2020 | Shin | H04L 5/0055 |
| 2020/0351057 A1* | 11/2020 | Yeo | H04L 5/0087 |
| 2020/0351856 A1* | 11/2020 | Yeo | H04L 5/0053 |
| 2021/0099265 A1* | 4/2021 | Shin | H04W 72/0453 |
| 2021/0152408 A1* | 5/2021 | Yeo | H04L 5/0053 |
| 2021/0176735 A1* | 6/2021 | Deng | H04W 72/0453 |
| 2021/0194652 A1* | 6/2021 | Khoryaev | H04L 5/0048 |
| 2021/0219268 A1* | 7/2021 | Li | H04W 72/20 |
| 2021/0227505 A1* | 7/2021 | Sarkis | H04B 7/0456 |
| 2021/0385822 A1* | 12/2021 | Chae | H04W 72/02 |
| 2022/0052822 A1* | 2/2022 | Lin | H04L 5/0044 |
| 2022/0070036 A1* | 3/2022 | Kwon | H04W 72/20 |
| 2022/0159694 A1* | 5/2022 | Peng | H04W 72/20 |
| 2022/0167313 A1* | 5/2022 | Zhou | H04W 72/02 |
| 2022/0190984 A1* | 6/2022 | Lee | H04L 1/0026 |
| 2022/0210804 A1* | 6/2022 | Hwang | H04W 72/20 |
| 2022/0225292 A1* | 7/2022 | Mohammad Soleymani | H04W 72/20 |
| 2022/0232525 A1* | 7/2022 | Lee | H04L 5/0051 |
| 2022/0232527 A1* | 7/2022 | Hong | H04W 72/542 |
| 2022/0240296 A1* | 7/2022 | Lee | H04W 72/02 |
| 2022/0247609 A1* | 8/2022 | Yeo | H04L 5/0053 |
| 2022/0271892 A1* | 8/2022 | Peng | H04L 5/0094 |
| 2022/0304032 A1* | 9/2022 | Hahn | H04W 76/14 |
| 2022/0312401 A1* | 9/2022 | Zhang | H04W 72/20 |
| 2022/0386345 A1* | 12/2022 | Lee | H04W 24/08 |
| 2023/0022077 A1* | 1/2023 | Liu | H04W 52/52 |
| 2023/0031787 A1* | 2/2023 | Peng | H04L 5/0053 |
| 2023/0199837 A1* | 6/2023 | Peng | H04W 48/16 370/329 |
| 2023/0269756 A1* | 8/2023 | Hong | H04W 72/25 370/329 |

OTHER PUBLICATIONS

Ericsson, "Details on physical layer structure for SL V2X", R1-1901211, 3GPP TSG-RAN WG1 Meeting # ah-1901, Taipei, Taiwan, Jan. 21-25, 2019, see section 8.

Qualcomm Incorporated, "Considerations on Physical Layer aspects of NR V2X", R1-1905008, 3GPP TSG RAN WG1 Meeting #96bis, Xian, China, Apr. 8-12, 2019, see sections 2-3.

Nokia et al., "Discussions on NR V2X Sidelink Physical Layer Structures", R1-1901155, 3GPP TSG RAN WG1 Meeting AH-1901, Taipei, Taiwan, Jan. 21-25, 2019, see section 2.

* cited by examiner (a)

(b)

(a)

(b)

(a)

(b)

FIG. 18 receiving second SCI transmitted
by the first apparatus through the PSSCH —S1810

METHOD AND DEVICE FOR TRANSMITTING PSCCH AND PSSCH

This application is the National Stage filing under 35 U.S.C. 371 of International Application No. PCT/KR2020/004535, filed on Apr. 2, 2020, which claims the benefit of and priority to U.S. Provisional Application No. 62/828,446, filed on Apr. 2, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between user equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and the like. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As a wider range of communication devices require larger communication capacities, the need for mobile broadband communication that is more enhanced than the existing radio access technology (RAT) is rising. Accordingly, discussions are made on services and user equipment (UE) that are sensitive to reliability and latency. A next-generation radio access technology that is based on the enhanced mobile broadband communication, massive machine-type communication (MTC), ultra-reliable and low latency communication (URLLC), and the like, may be referred to as a new radio access technology (RAT) or new radio (NR). Here, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message, such as a basic safety message (BSM), a cooperative awareness message (CAM), and a decentralized environmental notification message (DENM), is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

A technical problem of the present disclosure is to provide a sidelink (SL) communication method between apparatuses (or terminals) based on a V2X communication and an apparatus (or terminal) for performing the same.

Another technical problem of the present disclosure is to provide a method and an apparatus for mapping a second SCI based on a mapping location of a first demodulation reference signal (DMRS) for a physical sidelink shared channel (PSSCH) in a sub-channel.

According to one embodiment of the present disclosure, a method for a first apparatus to transmit a physical sidelink control channel (PSCCH) and a physical sidelink shared channel (PSSCH) to a second apparatus is provided. The method includes: determining whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel, determining a location of a reference symbol in a PSSCH resource in which a second sidelink information (SCI) is mapped based on whether the first DMRS symbol is occupied by the resource area for the PSCCH in the whole frequency band of the one PSSCH subchannel, mapping the second SCI based on the location of the reference symbol in the PSSCH resource and transmitting the second SCI to the second apparatus through the PSSCH.

According to another embodiment of the present disclosure, a first apparatus for transmitting a physical sidelink control channel (PSCCH) and a physical sidelink shared channel (PSSCH) to a second apparatus is provided. The first apparatus includes at least one memory to store instructions, at least one transceiver, and at least one processor to connect the at least one memory and the at least one transceiver, wherein the at least one processor is configured to: determine whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel, determine a location of a reference symbol in a PSSCH resource in which a second sidelink information (SCI) is mapped based on whether the first DMRS symbol is occupied by the resource area for the PSCCH in the whole frequency band of the one PSSCH subchannel, map the second SCI based on the location of the reference symbol in the PSSCH resource, and control the at least one transceiver to transmit the second SCI to the second apparatus through the PSSCH.

According to the other embodiment of the present disclosure, an apparatus for controlling a first terminal is provided. The apparatus includes at least one processor and at least one computer memory that is connected to be executable by the at least one processor and stores instructions, wherein, when the at least one processor executes the instructions, the first terminal is configured to: determine whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel, determine a location of a reference symbol in a PSSCH resource in which a second sidelink information (SCI) is mapped based on whether the first DMRS symbol is occupied by the resource area for the PSCCH in the whole frequency band of the one PSSCH subchannel, map the second SCI based on the location of the reference symbol in the PSSCH resource, and transmit the second SCI to a second terminal through the PSSCH.

According to the other embodiment of the present disclosure, a non-transitory computer-readable storage medium that stores instructions (or indications) is provided. When executed by at least one processor of the non-transitory computer-readable storage medium: whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel is determined by a first apparatus, a location of a reference symbol in a PSSCH resource in which a second sidelink information (SCI) is mapped based on whether the first DMRS symbol is occupied by the resource area for the PSCCH in the whole frequency band of the one PSSCH subchannel is determined by the first apparatus, the second SCI is mapped by the first apparatus based on the location of the reference symbol in the PSSCH resource, and the second SCI is transmitted by the first apparatus to a second apparatus through the PSSCH.

According to the other embodiment of the present disclosure, a method for a second apparatus to receive a physical sidelink control channel (PSCCH) and a physical sidelink shared channel (PSSCH) from a first apparatus is provided. The method includes: receiving second SCI transmitted by the first apparatus through the PSSCH, wherein a mapping location in at least one PSSCH subchannel of the second SCI is determined, in a whole frequency band of one PSSCH subchannel among the at least one PSCCH subchannel, based on a location of a reference symbol in a PSSCH resource which is based on whether a first DMRS symbol among a plurality of DMRS symbols is occupied by a resource area related to the PSCCH.

According to the other embodiment of the present disclosure, a second apparatus for receiving a physical sidelink control channel (PSCCH) and a physical sidelink shared channel (PSSCH) from a first apparatus is provided. The second apparatus includes at least one memory to store instructions, at least one transceiver, and at least one processor to connect the at least one memory and the at least one transceiver, wherein the at least one processor is configured to: control the at least one transceiver to receive second SCI transmitted by the first apparatus through the PSSCH, wherein a mapping location in at least one PSSCH subchannel of the second SCI is determined, in a whole frequency band of one PSSCH subchannel among the at least one PSCCH subchannel, based on a location of a reference symbol in a PSSCH resource which is based on whether a first DMRS symbol among a plurality of DMRS symbols is occupied by a resource area related to the PSCCH.

According to the present disclosure, vehicle-to-everything (V2X) communication can be effectively performed between apparatuses (or terminals).

According to the present disclosure, a second SCI may be mapped efficiently based on a mapping location of a first DMRS for a PSSCH in a sub-channel.

BRIEF DESCRIPTION OF THE DRAWINGS

FIG. 18 shows an operation of a second apparatus according to an embodiment of the present disclosure.

DESCRIPTION OF EXEMPLARY EMBODIMENTS

Figure 1:
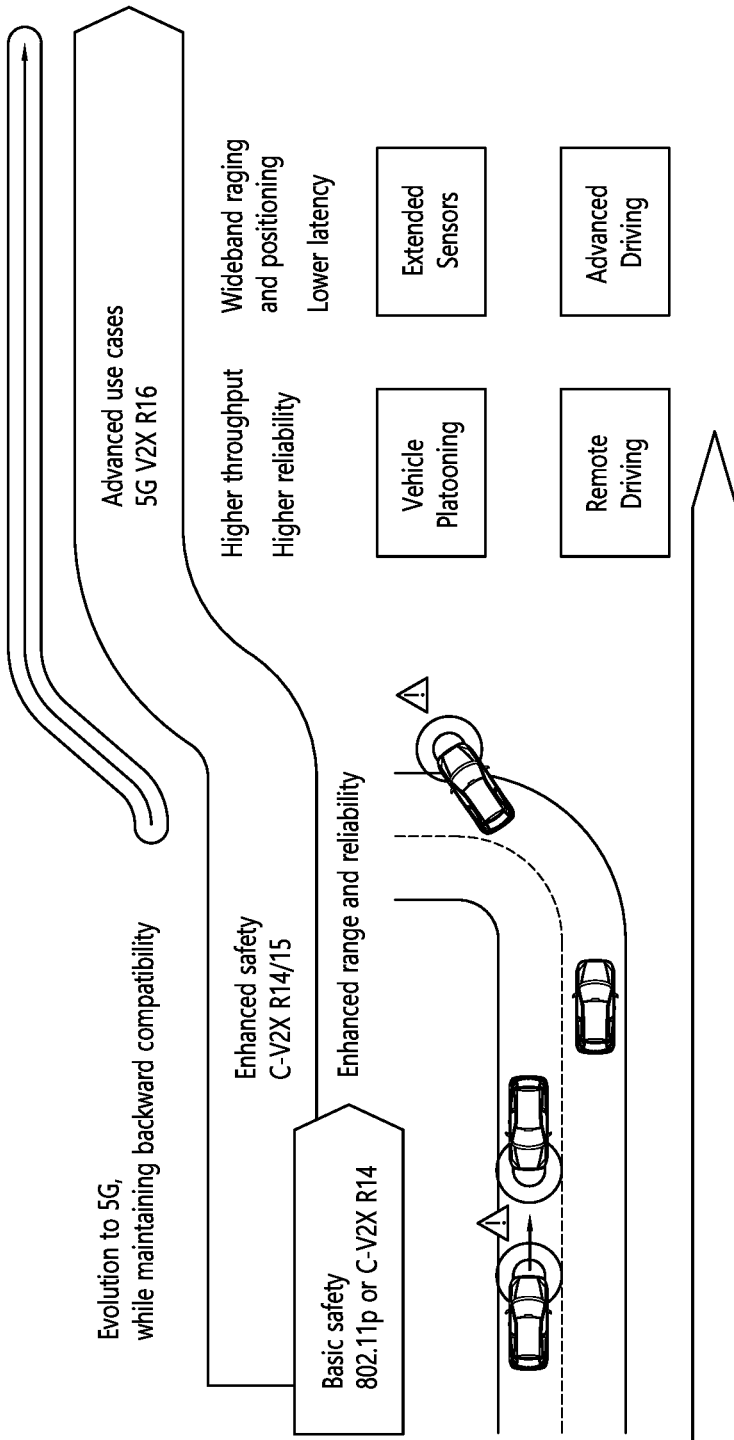
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and the like. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and the like. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and the like. 5G NR may use resources of all spectrum available for usage including low frequency bands of less than 1 GHz, middle frequency bands ranging from 1 GHz to 10 GHz, high frequency (millimeter waves) of 24 GHz or more, and the like.

For clarity in the description, the following description will mostly focus on LTE-A or 5G NR. However, technical features according to an embodiment of the present disclosure will not be limited only to this.

Figure 2:
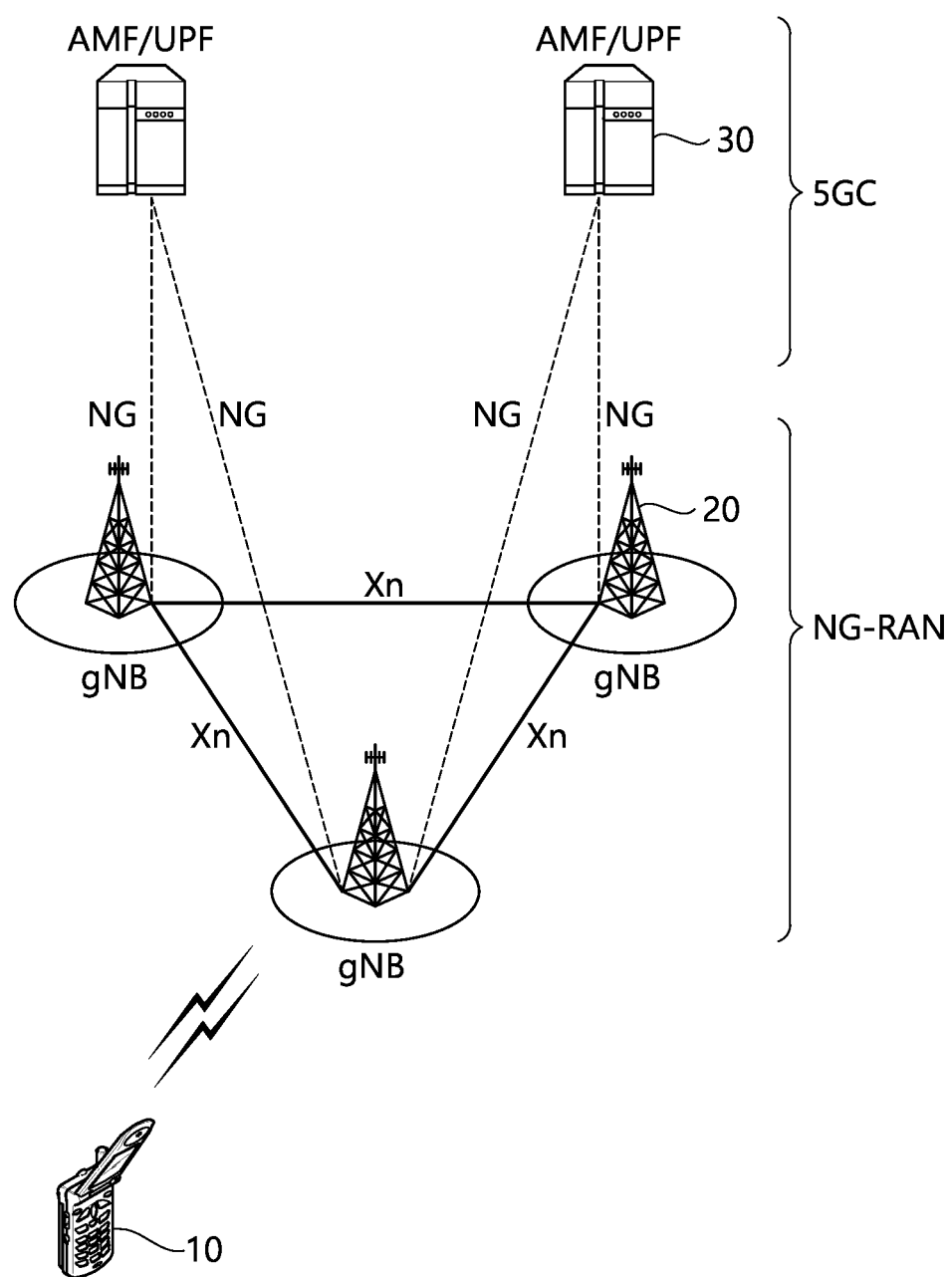
FIG. 2 shows a structure of an NR system in accordance with an embodiment of the present disclosure.

FIG. 2 shows a structure of an NR system in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), a wireless device, and the like. For example, the BS may be referred to as a fixed station which communicates with the UE 10 and may be referred to as other terms, such as a base transceiver system (BTS), an access point (AP), and the like.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
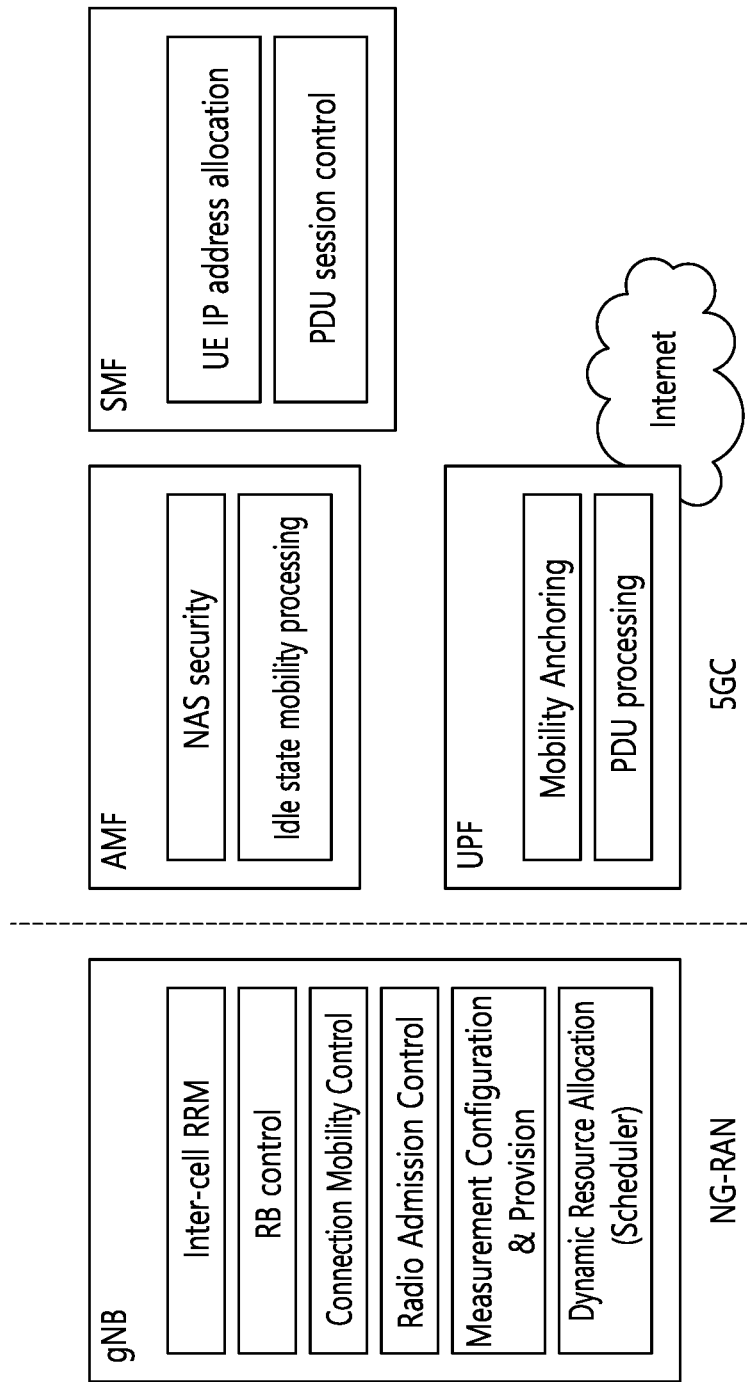
FIG. 3 shows a functional division between an NG-RAN and a 5GC in accordance with an embodiment of the present disclosure.

FIG. 3 shows a functional division between an NG-RAN and a 5GC in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and the like. An AMF may provide functions, such as non access stratum (NAS) security, idle state mobility processing, and the like. A UPF may provide functions, such as mobility anchoring, protocol data unit (PDU) processing, and the like. A session management function (SMF) may provide functions, such as user equipment (UE) Internet protocol (IP) address allocation, PDU session control, and the like.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
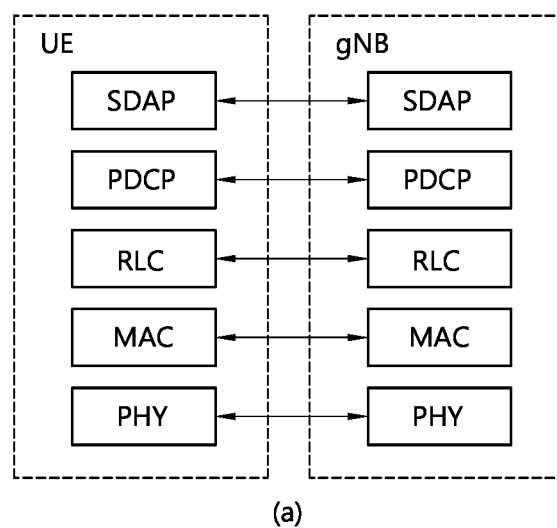
FIG. 4 shows a radio protocol architecture in accordance with an embodiment of the present disclosure.
Figure 4:
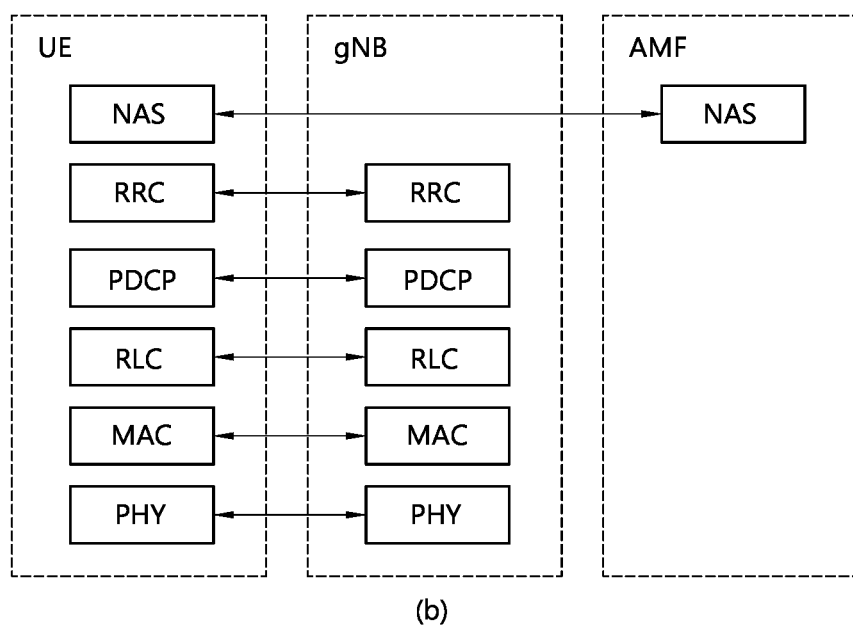

FIG. 4 shows a radio protocol architecture in accordance with an embodiment of the present disclosure. The embodiment of FIG. 4 may be combined with various embodiments of the present disclosure. Specifically, (a) of FIG. 4 shows a radio protocol architecture for a user plane, and (b) of FIG. 4 shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), or the like The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
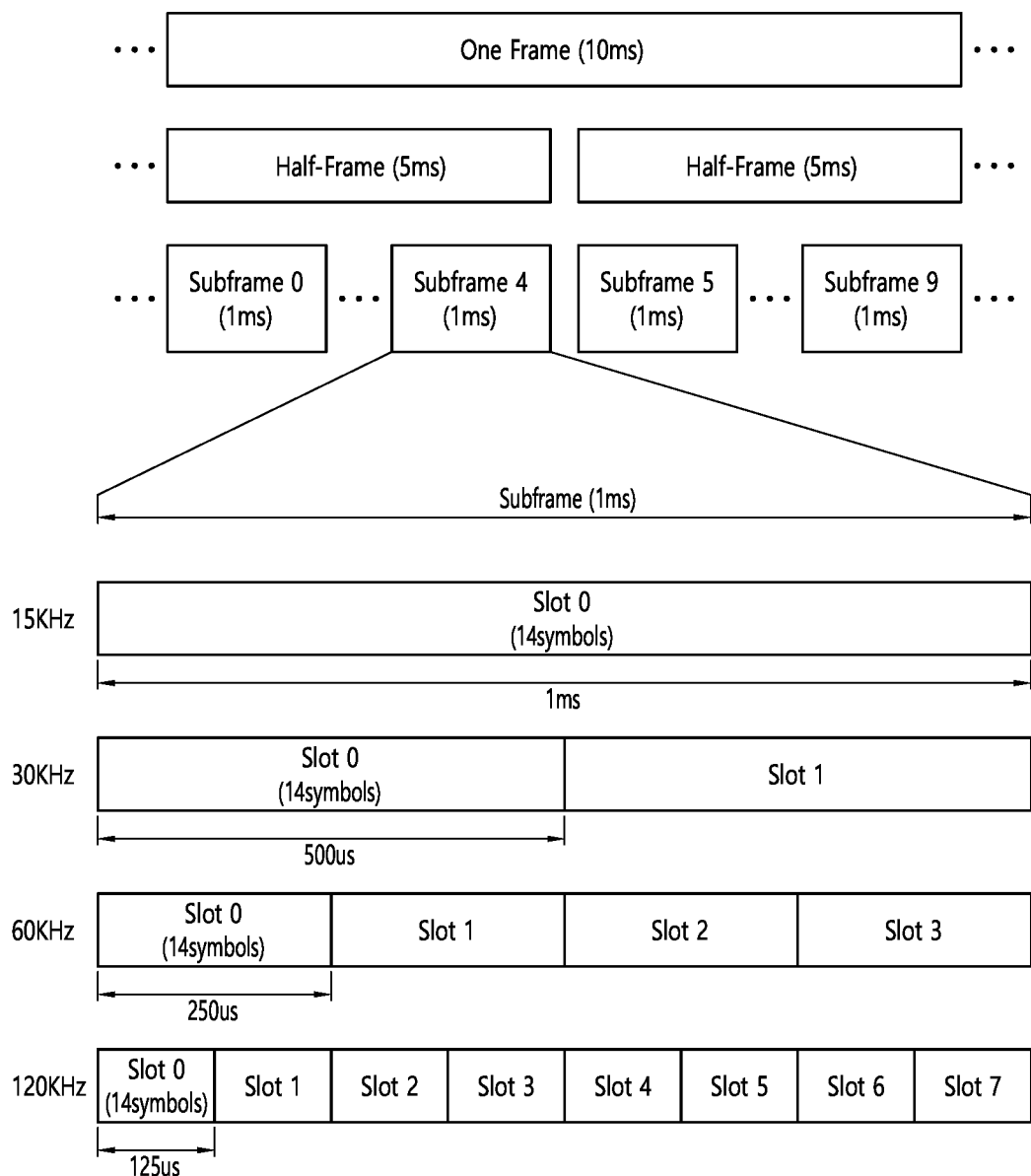
FIG. 5 shows a structure of an NR system in accordance with an embodiment of the present disclosure.

FIG. 5 shows a structure of an NR system in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Here, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and the like) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHz, and the like) and higher. For example, a frequency band of 6 GHz (or 5850, 5900, 5925 MHz, and the like) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
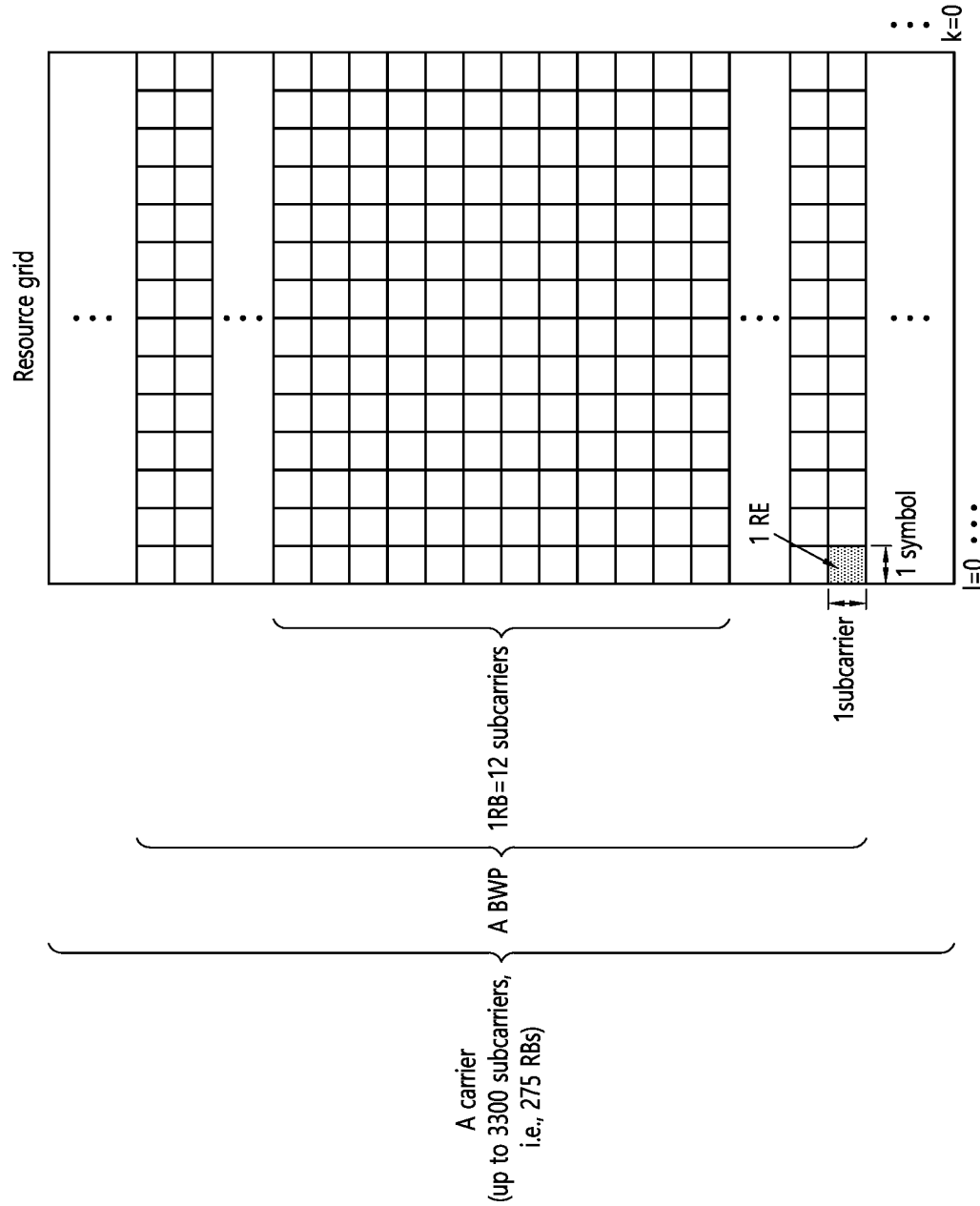
FIG. 6 shows a structure of a slot of an NR frame in accordance with an embodiment of the present disclosure.

FIG. 6 shows a structure of a slot of an NR frame in accordance with an embodiment of the present disclosure.

Referring to FIG. 6, a slot includes a plurality of symbols in a time domain For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and the like). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
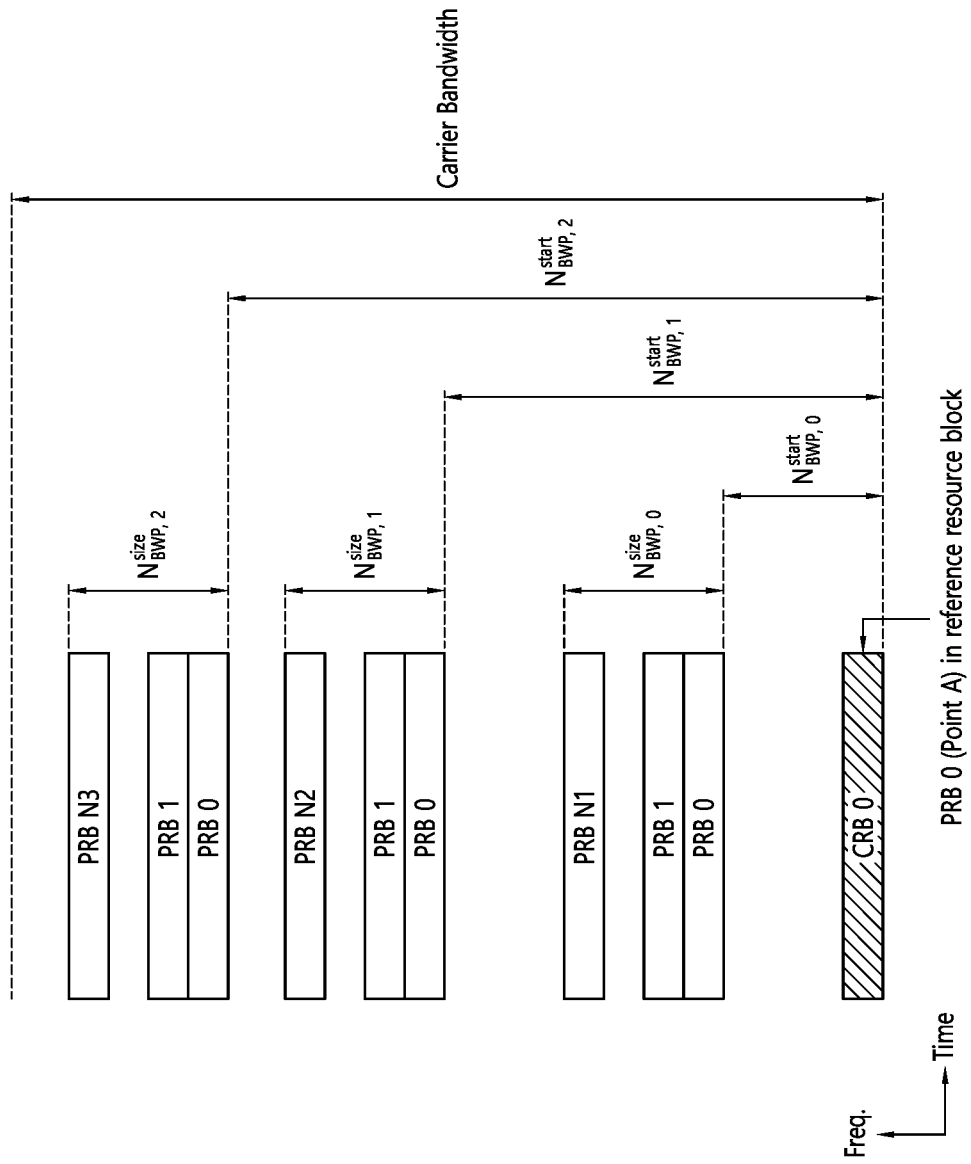
FIG. 7 shows an example of a BWP in accordance with an embodiment of the present disclosure.

FIG. 7 shows an example of a BWP in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
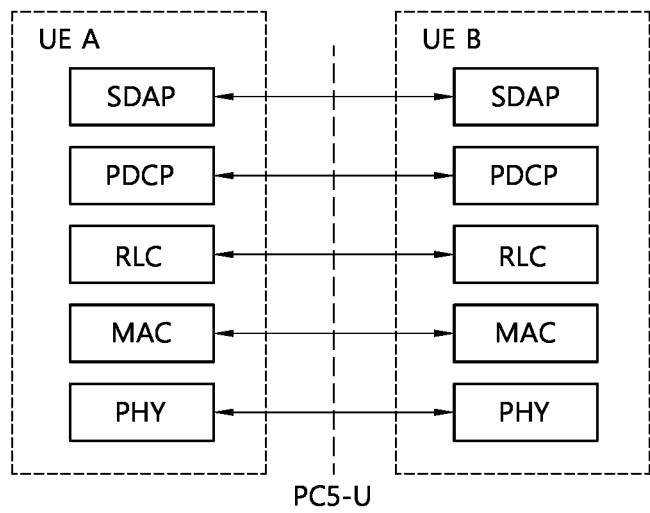
FIG. 8 shows a radio protocol architecture for a SL communication in accordance with an embodiment of the present disclosure.
Figure 8:
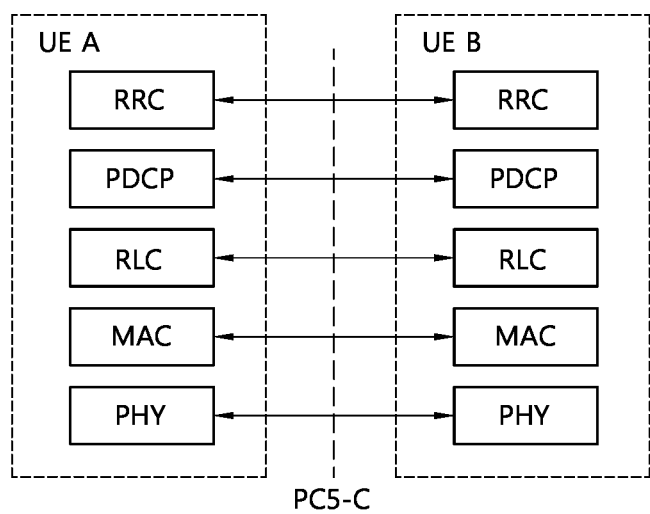

FIG. 8 shows a radio protocol architecture for a SL communication in accordance with an embodiment of the present disclosure. The embodiment of FIG. 8 may be combined with various embodiments of the present disclosure. More specifically, (a) of FIG. 8 shows a user plane protocol stack, and (b) of FIG. 8 shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
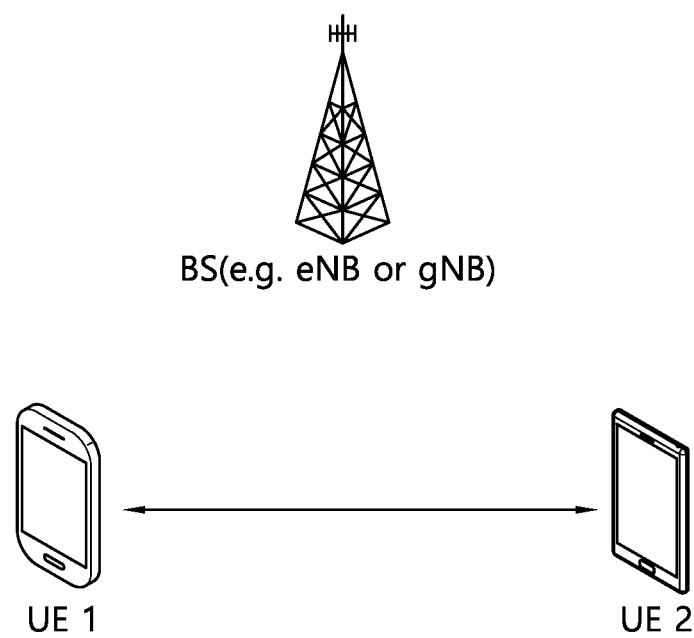
FIG. 9 shows a UE performing V2X or SL communication in accordance with an embodiment of the present disclosure.

FIG. 9 shows a UE performing V2X or SL communication in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
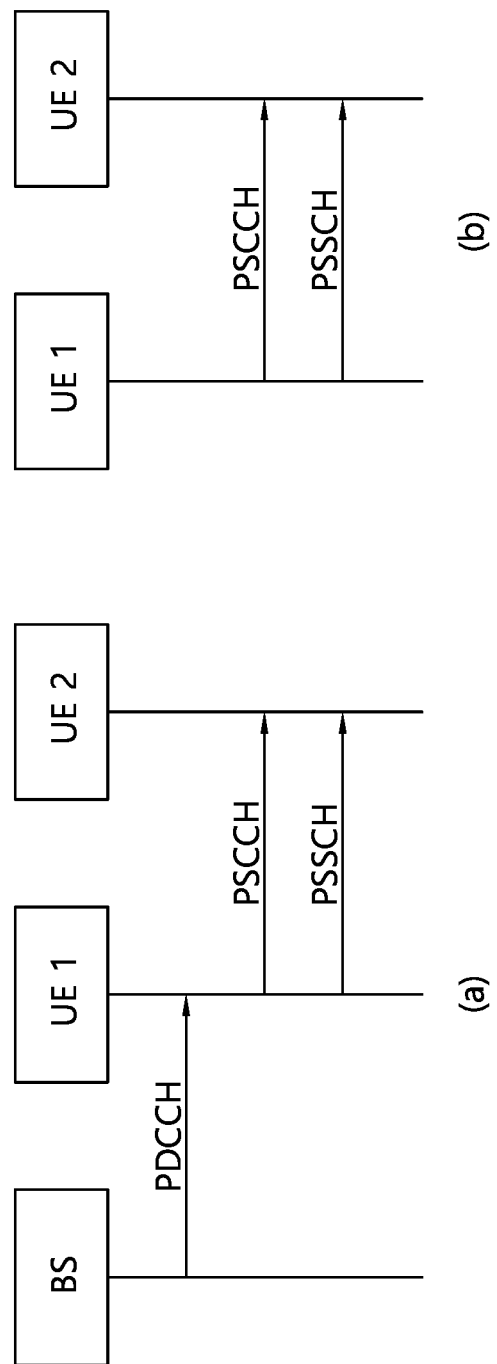
FIG. 10 shows a procedure of performing V2X or SL communication by a UE based on a transmission mode in accordance with an embodiment of the present disclosure.

FIG. 10 shows a procedure of performing V2X or SL communication by a UE based on a transmission mode in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 10 shows a UE operation related to an LTE transmission mode 1 or an LTE transmission mode 3. Alternatively, for example, (a) of FIG. 10 of shows a UE operation related to an NR resource allocation mode 1. For example, the LTE transmission mode 1 may be applied to general SL communication, and the LTE transmission mode 3 may be applied to V2X communication.

For example, (b) of FIG. 10 shows a UE operation related to an LTE transmission mode 2 or an LTE transmission mode 4. Alternatively, for example, (b) of FIG. 10 shows a UE operation related to an NR resource allocation mode 2.

Referring to (a) of FIG. 10, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 10, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
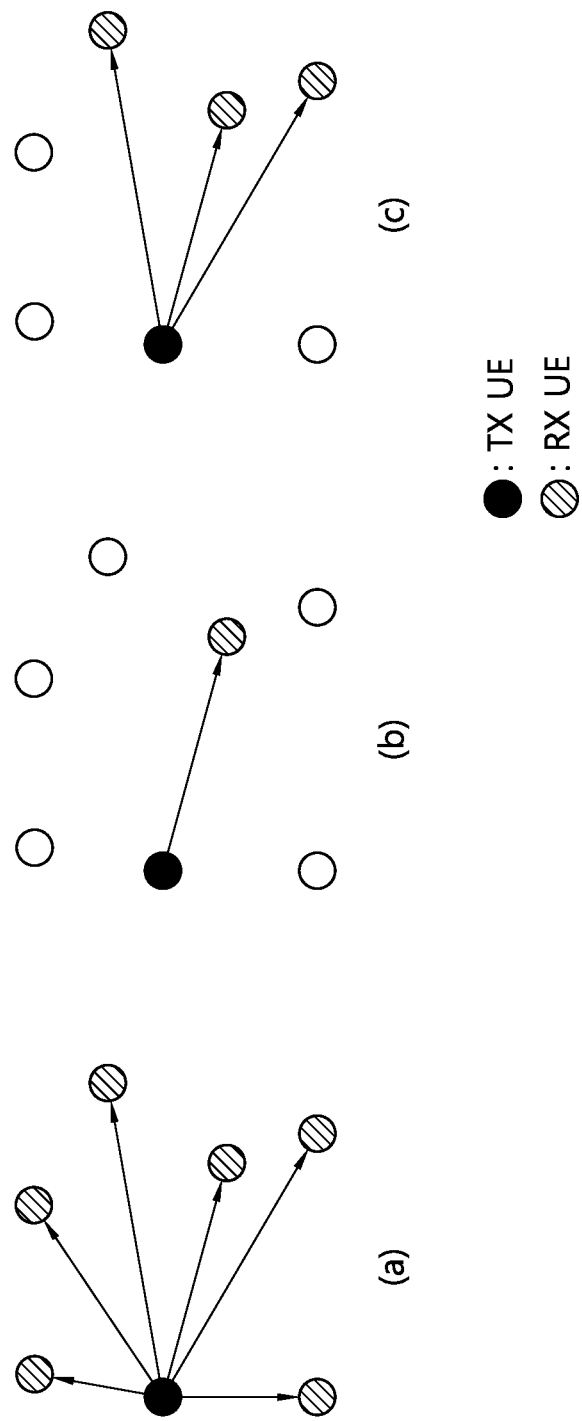
FIG. 11 shows three cast types in accordance with an embodiment of the present disclosure.

FIG. 11 shows three cast types in accordance with an embodiment of the present disclosure. The embodiment of FIG. 11 may be combined with various embodiments of the present disclosure. Specifically, (a) of FIG. 11 shows broadcast-type SL communication, (b) of FIG. 11 shows unicast type-SL communication, and (c) of FIG. 11 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in sidelink communication, a UE may need to effectively select a resource for sidelink transmission. Hereinafter, a method in which a UE effectively selects a resource for sidelink transmission and an apparatus supporting the method will be described according to various embodiments of the present disclosure. In various embodiments of the present disclosure, the sidelink communication may include V2X communication.

At least one scheme proposed according to various embodiments of the present disclosure may be applied to at least any one of unicast communication, groupcast communication, and/or broadcast communication.

At least one method proposed according to various embodiment of the present embodiment may apply not only to sidelink communication or V2X communication based on a PC5 interface or an SL interface (e.g., PSCCH, PSSCH, PSBCH, PSSS/SSSS, or the like) or V2X communication but also to sidelink communication or V2X communication based on a Uu interface (e.g., PUSCH, PDSCH, PDCCH, PUCCH, or the like).

In various embodiments of the present disclosure, a receiving operation of a UE may include a decoding operation and/or receiving operation of a sidelink channel and/or sidelink signal (e.g., PSCCH, PSSCH, PSFCH, PSBCH, PSSS/SSSS, or the like). The receiving operation of the UE may include a decoding operation and/or receiving operation of a WAN DL channel and/or a WAN DL signal (e.g., PDCCH, PDSCH, PSS/SSS, or the like). The receiving operation of the UE may include a sensing operation and/or a CBR measurement operation. In various embodiments of the present disclosure, the sensing operation of the UE may include a PSSCH-RSRP measurement operation based on a PSSCH DM-RS sequence, a PSSCH-RSRP measurement operation based on a PSSCH DM-RS sequence scheduled by a PSCCH successfully decoded by the UE, a sidelink RSSU (S-RSSI) measurement operation, and an S-RSSI measurement operation based on a V2X resource pool related subchannel. In various embodiments of the disclosure, a transmitting operation of the UE may include a transmitting operation of a sidelink channel and/or a sidelink signal (e.g., PSCCH, PSSCH, PSFCH, PSBCH, PSSS/SSSS, or the like). The transmitting operation of the UE may include a transmitting operation of a WAN UL channel and/or a WAN UL signal (e.g., PUSCH, PUCCH, SRS, or the like). In various embodiments of the present disclosure, a synchronization signal may include SLSS and/or PSBCH.

In various embodiments of the present disclosure, a configuration may include signaling, signaling from a network, a configuration from the network, and/or a pre-configuration from the network. In various embodiments of the present disclosure, a definition may include signaling, signaling from a network, a configuration form the network, and/or a pre-configuration from the network. In various embodiment of the present disclosure, a designation may include signaling, signaling from a network, a configuration from the network, and/or a pre-configuration from the network.

In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability In various embodiments of the present disclosure, a session may include at least any one of a unicast session (e.g., unicast session for sidelink), a groupcast/multicast session (e.g., groupcast/multicast session for sidelink), and/or a broadcast session (e.g., broadcast session for sidelink).

In various embodiments of the present disclosure, a carrier may be interpreted as at least any one of a BWP and/or a resource pool. For example, the carrier may include at least any one of the BWP and/or the resource pool. For example, the carrier may include one or more BWPs. For example, the BWP may include one or more resource pools.

Meanwhile, in an embodiment, at least one of the following information may be transmitted from the transmitting terminal to the receiving terminal through sidelink control information (SCI) or by being included in the SCI. That is, the SCI may include PSSCH resource allocation information and/or PSCCH resource allocation information (eg, the location of time resources, the location of frequency resources, the number of time resources and/or the number of frequency resources), resource reservation information (eg For example, period), SL Channel State Information (CSI) report request indicator (or SL Reference Signal Received Power (RSRP) information report request indicator, Reference Signal Received Quality (SL RSRQ), SL RSSI (Received Signal Strength Indication), SL RSRP and/or SL RSRQ and/or SL RSSI information report request indicator, etc.), SL CSI transmission indicator (on PSSCH) (or Reference Signal Received Power (SL RSRP) information transmission indicator, Reference Signal Received Quality (SL RSRQ)) Information transmission indicator, Received Signal Strength Indication (SL RSSI) information transmission indicator, SL RSRP and/or SL RSRQ and/or SL RSSI information transmission indicator, etc.), MCS (Modulation Coding Scheme) information, transmission power (TX power) information, L1 destination ID information and/or L1 source ID information, SL HARQ process ID information, NDI information, RV information, (transmission traffic and/or packet related) QOS information (eg, priority), SL CSI-RS transmission indicator (or (transmitted) SL CSI-RS antenna port number information), transmission terminal (TX UE) location information (or target receiving terminal location (or distance area) information or SL HARQ feedback-requested location (or distance area) of a target receiving terminal information.

In one example, the SCI-related information may be transmitted through SCI on one PSCCH, but in this case, performance degradation may be induced due to a large payload size. As a method for solving the above problem, the SCI-related information may be divided into a preconfigured number (eg, two) of groups, and information belonging to the first group (first SCI) may be transmitted through SCI on PSCCH, and information belonging to the second group (second SCI) may be transmitted through some time and/or frequency resources on the PSSCH. In this case, the transmission may be referred to as transmission through piggyback on PSSCH.

In an embodiment, information transmitted through the first SCI may be composed of information requiring a relatively fast decoding (and/or information required for second SCI (or data) decoding or the second SCI (or data) buffering) (eg, MCS information), information required for the second SCI (or data) mapping pattern (or rate matching pattern, or puncturing pattern) perception (eg, SL CSI-RS transmission indicator, (transmitted) SL CSI-RS antenna port number information, SL CSI transmission indicator, SL RSRP information transmission indicator, SL RSRQ information transmission indicator, SL RSSI information transmission indicator, SL RSRP and/or SL RSRQ and/or SL RSSI information transmission indicator, etc), information used for sensing operation (for a prevention of select resource collision/overlap between difference terminals) (eg, resource allocation information, QOS information) and/or information for knowing whether a data channel decoding based on the second SCI is actually needed (eg, L1 DESTINATION ID information, L1 SOURCE ID information), etc.

In an embodiment, information transmitted through the second SCI may be composed of information required for a (not requesting a fast decoding) data decoding (eg, MCS information, NDI information, RV information, SL HARQ PROCESS ID information), relatively bigger payload information (eg, TX UE location information, information on location (or distance area) of a target RX UE (requiring SL HARQ feedback)) and/or information on variation of payload (according to a transmission method, communication type, whether SL HARQ feedback configuration is configured, etc) (eg, L1 SOURCE ID information, L1 DESTINATION ID information), etc.

In an embodiment, the L1 SOURCE ID may be configured to have a payload which is relatively bigger than a size of L1 DESTINATION ID field transmitted through the first SCI on the PSCCH when the L1 SOURCE ID information is transmitted through the second SCI (which is piggybacked on the PSSCH). This is for a purpose of decreasing the measure error probability of HARQ buffer corruption and/or SL CSI.

In the present disclosure, "PSCCH (or SCI)" may be interpreted broadly as the first SCI and/or the second SCI.

In an embodiment, some bits (or state) of (PSSCH and/or PSCCH) resource reservation information field (eg, period)) on the SCI may be configured to inform the TTI number used for the specific TB transmission, which is not for the corresponding usage of them. For example, some bits (or state) of the resource reservation information field (eg, period) may be configured to inform the TTI (or slot) number used for the specific TB transmission, which is contiguous on the time resource area and which is not for the corresponding usage of them. In one example, the frequency resource locations used for the TB transmission on a plurality of TTIs (or slots) may be assumed to be the same.

In another embodiment, some bits (or state) of (PSSCH and/or PSCCH) resource reservation information field (eg, location and/or number of time and/or frequency resource) on the SCI may be configured to inform the TTI number used for the specific TB transmission, which is not for the corresponding usage of them. For example, some bits (or state) of the resource reservation information field (eg, period) may be configured to inform the TTI (or slot) number used for the specific TB transmission, which is contiguous on the time resource area and which is not for the corresponding usage of them. In one example, the frequency resource locations used for the TB transmission on a plurality of TTIs (or slots) may be assumed to be the same.

In one embodiment, according to the number of subchannels (and/or subchannel locations) used for PSCCH (and/or PSSCH) transmission, the existence of the (PSSCH and/or PSCCH) resource allocation information field on the SCI (eg, time/Frequency resource location/number) may be configured differently. In one example, when PSCCH transmission is performed through pre-configured K (eg, 1) subchannels, the corresponding PSSCH transmission may also be performed through K subchannels (in the same location), and in this case, the resource allocation information field on the SCI may be omitted. For example, when PSCCH transmission is performed through pre-configured K (eg, 1) subchannels, it is assumed to target a relatively short target distance in consideration of an increased (effective) coding rate, etc, the corresponding PSSCH transmission may also be performed through K subchannels (in the same location), and in this case, the resource allocation information field on the SCI may be omitted.

In an embodiment, when piggy-backing the second SCI on the PSSCH and transmitting it, it order to reduce the influence of in-band emission (interference) coming from the neighboring (frequency) resource area or coming from the transmission of another terminal of the neighboring resource area, mapping may be performed to the middle area on the PSSCH frequency resource (eg, after performing mapping in a frequency-first form in the corresponding frequency area, the remaining information may be mapped in a form of frequency-first and distributed). For example, when piggy-backing the second SCI on the PSSCH and transmitting it, in order to reduce the influence of in-band emission (interference) coming from the neighboring (frequency) resource area, or coming from the transmission of another terminal of the neighboring resource area, mapping may be performed to the (preconfigured) (relatively) middle area on the PSSCH frequency area (eg, after performing mapping in a frequency-first form in the corresponding frequency area, the remaining information may be mapped in a form of frequency-first and distributed (that is, maximally distributed separation mapping in the frequency domain) (alternatively, not to be mapped in a(n) (preconfigured)(relatively) edge area)). Here, for example, the number of resources to which the second SCI is mapped may be configured differently according to a service type, a requirement (eg, latency, reliability, congestion level), SL quality and/or measurement value. Here, for example, among the second SCI configuration information, the preconfigured relatively high priority information (eg, MCS information, NDI information, RV information, SL HARQ process ID information, etc) may be mapped on the symbol closest to the DM-RS symbol on the PSSCH. For example, among the second SCI configuration information, the preconfigured relatively high information may be mapped (first) on the symbol closest to the (first) DM-RS symbol on the PSSCH (on the time resource domain). Here, for example, when SL CSI information is piggybacked and transmitted on the PSSCH together with the second SCI, assuming that the SL CSI information have a relatively lower priority than the second SCI, the second SCI may be mapped first on the symbol closest to the DM-RS symbol, and the SL CSI information may be mapped later. For example, when SL CSI information (and/or SL measurement information) is piggybacked and transmitted on the PSSCH together with the second SCI, assuming a relatively lower priority than the second SCI, the second SCI may be mapped first on the symbol closest to the DM-RS symbol (on the time resource area), and the SL CSI information(and/or SL measurement information) may be mapped (later) (alternatively, assuming a relatively higher priority than the second SCI, the SL CSI information (and/or SL measurement information) may be mapped first to the symbol closest to the DM-RS symbol (on the time resource area), and the second SCI may be mapped (afterward)).

In an embodiment, it may be defined to signal SCI transmission related PSD increase information on SCI. For example, it may be defined to signal SCI transmission related PSD increase information on SCI, or it may be defined to signal second SCI transmission related PSD increase information in the first SCI. For example, it may be defined to signal SCI transmission related PSD increase information on SCI, and it may be defined to signal second SCI transmission related PSD increase information in the first SCI. In another example, if the first SCI transmission-related PSD is increased, it may be assumed that the second SCI transmission-related PSD is also (implicitly) increased (according to a preconfigured ratio or equal to the first SCI transmission-related PSD increase value). For example, if the first SCI transmission-related PSD is increased, it may be assumed that the second SCI transmission-related PSD is also (implicitly) increased (according to a preconfigured ratio or equal to the first SCI transmission-related PSD increase value).

In an embodiment, when PSSCH transmission related to a specific transport block (or, TB) is performed over a plurality of slots, whether to perform the SL CSI-RS transmission may be indicated and/or controlled in units of PSSCH groups in which PSCCH is transmitted, or when SL CSI-RS is transmitted on at least one PSSCH, SL CSI-RS may be transmitted on all PSSCHs.

In an embodiment, the PSSCH may include a PSSCH for an Nth slot, a PSSCH for an N+1th slot, and a PSSCH for an N+2th slot in the subchannel, and the PSCCH may include a PSCCH for the Nth slot, a PSCCH for the N+1th slot, and a PSCCH for the N+2th slot in the subchannel, wherein the PSSCH for the Nth slot may be related to the PSCCH for the Nth slot, and the PSSCH for the N+1th slot may be related to the PSCCH for the N+1th slot.

In this case, whether or not to transmit an SL Channel State Information-Reference Signal (CSI-RS) related to the PSSCH for the Nth slot may be controlled by the PSCCH for the Nth slot, whether or not to transmit the SL CSI-RS related to the PSSCH for the N+1th slot may be controlled by the PSCCH for the N+1th slot, and whether or not to transmit the SL CSI-RS related to the PSSCH for the N+2th slot may be controlled by the PSCCH for the N+2th slot.

Figure 12:
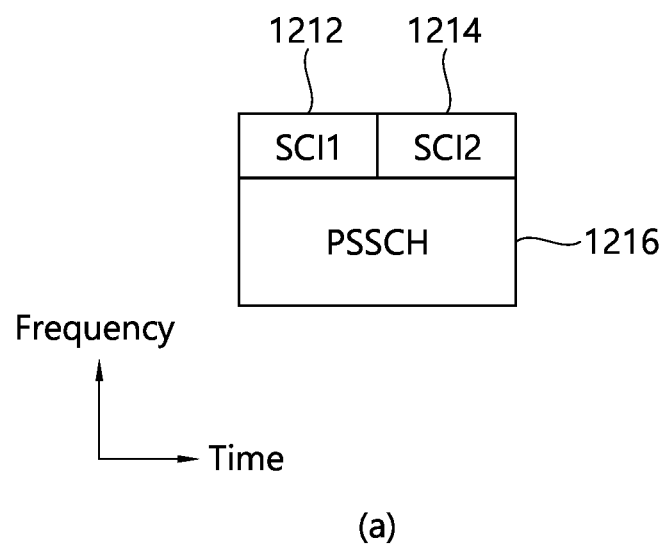
FIG. 12 shows an examples for resource mapping relations of a PSSCH, first SCI and second SCI.
Figure 12:
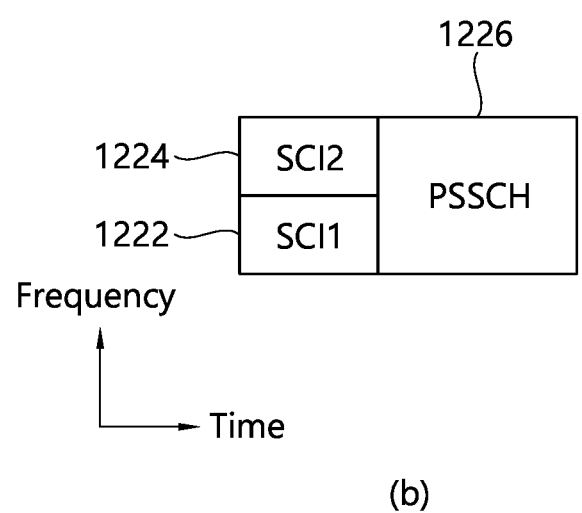

FIG. 12 shows an examples for resource mapping relations of a PSSCH, first SCI and second SCI.

In an embodiment, as shown in (a) of FIG. 12, time division multiplexing (TDM) may be performed to (a resource area for) the first SCI and (a resource region for) the second SCI, and frequency division multiplexing may be performed to the TDMed first SCI and second SCI and the PSSCH (on the same time resource region), and it may be transmitted. The resource area allocation form of (a) of FIG. 12 may have a purpose of, for example, increasing the total energy by sufficiently securing the number of symbols used for transmission of the first SCI and the second SCI.

In another embodiment, as shown in (b) of FIG. 12, FDM may be performed to (resource area for) the first SCI and (resource area for) the second SCI, the TDM may be performed to the FDMed first SCI and second SCI and the PSSCH, and it may be transmitted. The resource area allocation form of (b) of FIG. 12, for example, may have the purpose of reducing the (effective) coding rate by sufficiently securing the number of frequency resources used for transmission of the first SCI and the second SCI.

In an example, the first SCI and the second SCI on (a) and (b) of FIG. 12 may be transmitted through the independent PSCCHs.

Figure 13:
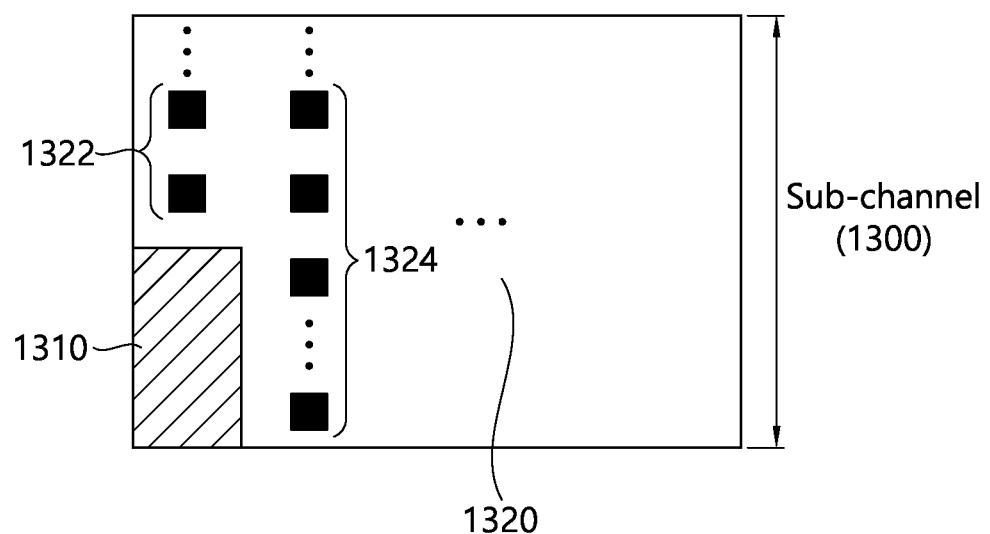
FIG. 13 shows resource mapping relations of a DMRS for a PSSCH in a subchannel and a PSCCH.

FIG. 13 shows resource mapping relations of a DMRS for a PSSCH in a subchannel and a PSCCH.

In an embodiment, when the first SCI is transmitted through the PSCCH, a resource location and/or number of a transmission related time and/or frequency of the second SCI may be determined implicitly based on a a parameter and/or index for the first SCI-related PSCCH time and/or frequency resource location and/or number. For example, when the PSCCH is transmitted through the PSCCH, the resource location and/or number of the transmission-related time and/or frequency of the second SCI may be determined implicitly based on a parameter and/or index for a location and/or number of the first SCI-related PSCCH time and/or frequency resource (and/or an input parameter used for determining the second SCI transmission time and/or a location of the frequency resource and/or number) (through a predefined function and/or rule).

Referring to FIG. 13, a hatched area in the (PSSCH) subchannel 1300 indicates a resource area 1310 related to the PSCCH, and an area other than the hatched region (or some of the areas other than the hatched area) indicates a resource area 1320 for the PSSCH. A plurality of shaded REs 1322 and 1324 in the subchannel 1300 represent demodulation reference signals (DMRS)s for the PSSCH. (REs for) the DMRS symbol 1322 represents (REs for) a first DMRS symbol among a plurality of DMRS symbols for the PSSCH, (REs for) the DMRS symbol 1324 represents a second DMRS symbol among a plurality of DMRS symbols for the PSSCH.

A terminal according to an embodiment may determine whether the first DMRS symbol 1322 for the PSSCH in the subchannel 1300 is occupied by the resource area 1310 for the PSCCH in the whole frequency band based on the resource area 1310 for the PSCCH in the subchannel 1300.

A terminal according to an embodiment may determine a location of the reference symbol in the PSSCH resource in which the second SCI is mapped based on whether the first DMRS symbol 1322 in the whole frequency band of the subchannel 1300 is occupied by the resource area 1310 for the PSCCH.

Referring to an example according to FIG. 13, the terminal may determine the first DMRS symbol 1322 as a reference symbol based on the first DMRS symbol 1322 for the PSSCH being not occupied by the resource area 1310 for the PSCCH in the whole frequency band of the subchannel 1300. In an example, the terminal may map the second SCI to at least one RE excluding DMRS REs on the determined reference symbol. In another example, the terminal may map the second SCI to at least one RE on the symbol which is TDMed (that is, TDM is performed) with the determined reference symbol.

Meanwhile, in an embodiment, the proposed methods may be limitedly applied only when the second SCI is transmitted through an independent PSCCH. Also, in another embodiment, the number and/or location of frequency resources used for transmission of the first SCI and the second SCI may be configured and/or assumed to be the same.

Figure 14:
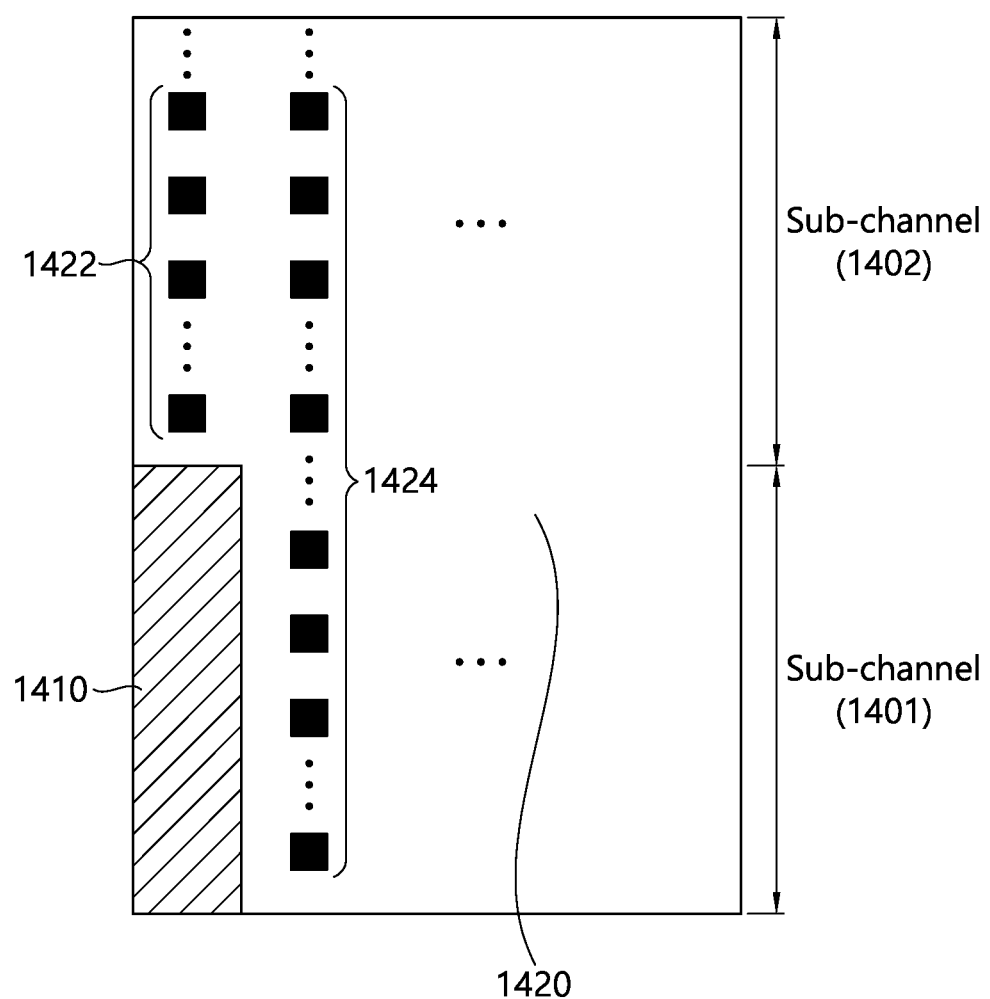
FIG. 14 shows resource mapping relations of a DMRS for a PSSCH in two or more subchannels and a PSCCH.

FIG. 14 shows resource mapping relations of a DMRS for a PSSCH in two or more subchannels and a PSCCH.

Referring to FIG. 14, a hatched area within the (PSSCH) subchannel 1401 indicates a resource area 1410 related to the PSCCH, and an area (or a portion of the area other than the hatched area) other than the hatched area of the subchannel 1401 and the subchannel 1402 indicates the resource area 1420 for the PSSCH. A plurality of shaded REs 1422, 1424 in the subchannel 1400 indicate DMRSs for the PSSCH. (REs for) the DMRS symbol 1422 indicates (REs for) the first DMRS symbol among the plurality of DMRS symbols for the PSSCH, and (REs for) the DMRS symbol 1424 indicates (REs for) the second DMRS symbol among the plurality of DMRS symbols for the PSSCH. Meanwhile, a person skilled in the art will easily understand that although the PSSCH is illustrated as being transmitted through two subchannels in FIG. 14, it may also be transmitted through two or more subchannels.

Referring to FIG. 14, it may be confirmed that there is no PSSCH to which the FDM is performed with the resource area 1410 for the PSCCH in the single subchannel 1401. However, since the PSSCH 1420 is transmitted through two or more subchannels 1401 and 1402, when viewed based on the two or more subchannels 1401 and 1402, it may be confirmed that there is a PSSCH to which the FDM is performed with the resource area 1410 for the PSCCH. That is, the case of FIG. 14 represents a case in which the first DMRS symbol 1422 for the PSSCH 1420 is not occupied by the resource area 1410 for the PSCCH in the whole frequency band of the two or more subchannels 1401 and 1402.

In FIG. 14, like FIG. 13, it may be interpreted that the first DMRS symbol 1422 for the PSSCH 1420 is not eroded by the resource region 1410 for the PSCCH. Accordingly, the embodiment according to FIG. 14 may operate on the same or similar principle to the embodiment according to FIG. 13.

The terminal according to an embodiment may determine whether the DMRS symbol 1422 for the PSSCH in the two or more subchannels 1401 and 1402 is occupied by the resource area 1410 for the PSCCH in the whole frequency band of the two or more subchannels 1401 and 1402 based on the resource area 1410 for the PSCCH in the two or more subchannels 1401 and 1402.

The terminal according to an embodiment may determine a location of a reference symbol in the PSSCH resource to which the second SCI is mapped based on whether the first DMRS symbol 1422 is occupied by the resource area 1410 for the PSCCH in the whole frequency band of the two or more subchannels 1401 and 1402.

Referring to an example according to FIG. 14, it may be confirmed that the resource area 1410 for the PSCCH occupies the whole frequency band of the lowest frequency single PSSCH subchannel 1401 among the two or more PSSCH subchannels 1401 and 1402, and does not occupy the whole frequency band of the subchannel 1402 where the FDM is performed. The terminal according to an embodiment may determine the first DMRS symbol 1422 as the reference symbol based on that the first DMRS symbol 1422 for the PSSCH is not occupied by the resource area 1410 for the PSCCH in the whole frequency band in the single PSSCH subchannel 1402 where the FDM is performed with the lowest single PSSCH subchannel 1401 among the two PSSCH subchannels 1401 and 1402.

In one example, the terminal may map the second SCI to at least one RE excluding DMRS REs on the determined reference symbol. In another example, the terminal may map the second SCI to at least one RE on a symbol to which the TDM is performed with the determined reference symbol.

Figure 15:
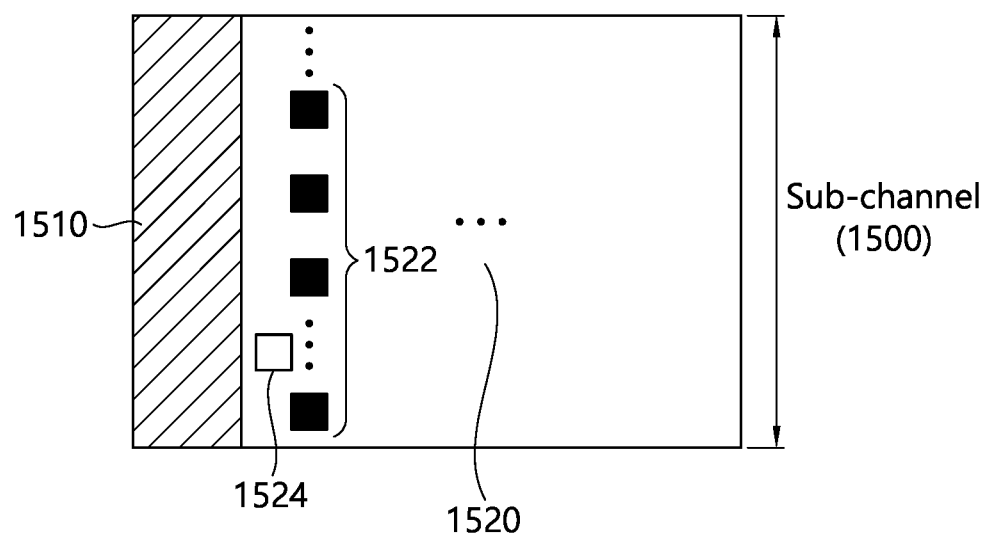
FIG. 15 shows resource mapping relations of a DMRS for a PSSCH in a single subchannel and a PSCCH.

FIG. 15 shows resource mapping relations of a DMRS for a PSSCH in a single subchannel and a PSCCH.

Referring to FIG. 15, the hatched area in the (PSSCH) (single) subchannel 1500 indicates the resource area 1510 for the PSCCH, and the area other than the hatched area (or some of the areas other than the hatched area) represents the resource area 1520 for the PSSCH. A plurality of shaded REs 1522 in the subchannel 1500 represent the DMRS symbol for the PSSCH. (REs for) the DMRS symbol 1522 represents (REs for) the second DMRS symbol among the plurality of DMRS symbols for the PSSCH.

The terminal according to an embodiment may determine whether the first DMRS symbol 1522 in the subchannel 1500 is occupied by the resource area 1510 for the PSCCH in a whole frequency band of the subchannel 1500 based on the resource area 1510 for the PSCCH in the subchannel 1500.

The terminal according to an embodiment may determine the location of the reference symbol in the PSSCH resource where the second SCI is mapped based on whether the first DMRS symbol 1522 is occupied by the resource area 1510 for the PSCCH in the whole frequency band of the subchannel 1500.

In an example according to FIG. 15, the terminal may determine the DMRS symbol 1522 for the PSSCH which is an initial symbol after the ending symbol of the resource area 1510 for the PSCCH as the reference symbol based on that the first DMRS symbol for the PSSCH is occupied by the resource area 1510 for the PSCCH in the whole frequency band of the subchannel 1500. That is, the terminal may determine the second DMRS symbol 1522 for the PSSCH as the reference symbol. In an example, the terminal may map the second SCI to at least one RE excluding the DMRS REs in the determined reference symbol. In another example, the terminal may map the second SCI to at least one RE on a symbol to which the TDM is performed with the determined reference symbol.

In another example according to FIG. 15, the terminal may determine the symbol 1524 in which the TDM is performed with the ending symbol of the resource area 1510 for the PSCCH as the reference symbol based on that the first DMRS symbol 1522 for the PSSCH is occupied by the resource area 1510 for the PSCCH in the whole frequency band of the subchannel 1500.

Regarding FIG. 13 through FIG. 15, the following embodiments may be applied.

In an embodiment, in the present disclosure, it may be interpreted that the word "PSSCH symbol" refers to a PSSCH symbol to which an RS (eg, PSSCH DMRS) is mapped and a PSSCH symbol to which data is mapped (alternatively, it means PSSCH symbol to which only data is mapped). In addition, in the present disclosure, it may be interpreted that the word "PSSCH DMRS symbol" refers to a symbol in which the PSSCH DMRS is transmitted through some (or all) REs. In addition, in the present disclosure, the word "PSSCH symbol" may be interpreted broadly to "PSSCH DMRS symbol".

In an embodiment, when the number of PSCCH RBs is configured equal to the number of RBs related to one subchannel, the 2nd SCI may be mapped according to the following (some) rules. Here, as an example, the following (some) rules may be limitedly applied when the terminal performs PSSCH transmission using one subchannel. Here, as an example, it may be assumed that the 2nd SCI mapping is performed from the (mapping) available start symbol in the frequency first & time second direction. In addition, as an example, on the following (some) proposed rules, the 2nd SCI mapping-related start symbol position may be configured/defined differently according to (transmission packet-related) service priority and/or service requirement (eg, reliability, latency) and/or (absolute or relative) movement speed and/or (resource pool) congestion level. In addition, as an example, an applying rule may be configured differently between an SL slot in which a PSFCH resource exists and an SL slot in which a PSFCH resource does not exist (and/or according to whether the PSFCH resource is configured in the resource pool).

(Option A) A location of a starting symbol related to 2nd SCI mapping is defined as a (first appearing) PSSCH symbol (on the time domain) after the PSCCH ending symbol, and/or (Option B) A location of a starting symbol related to 2nd SCI mapping is defined as a PSSCH DMRS symbol (or PSSCH DMRS symbol of preconfigured location/order after the PSCCH ending symbol) appearing first after the PSCCH ending symbol on the time domain, and/or (Option C) 2nd SCI mapping is performed by considering a first (PSSCH) DMRS on the PSSCH as a starting symbol without a consideration to the PSCCH mapping resource, wherein the 2nd SCI information mapped in an area overlapping with the PSCCH mapping resource is defined to be punctured, and/or (Option D) A location of a starting symbol related to the 2nd SCI mapping is defined to a symbol among the PSSCH symbol (firstly appearing on the time domain) and the PSSCH DMRS symbol (firstly appearing on the time domain) after the PSCCH ending symbol.

In an embodiment, when the number of PSCCH RBs is configured equal to the number of RBs related to one subchannel, it is assumed that the minimum number of subchannels used for PSSCH transmission is two or more (eg, it may be interpreted that PSSCH transmission based on one subchannel is not allowed).

In an embodiment, when the following (some) conditions are satisfied, the terminal does not expect that the number of PSCCH RB is configured samely as the RB number related to one subchannel, or it may be configured to assume that the minimum subchannel number used for the PSSCH transmission is equal to or greater than 2. Here, as an example, the following case may be interpreted as the case in which the resource amount available for the 2nd SCI mapping (when performing the PSSCH transmission based on one subchannel) is not sufficient (and/or, a case in which PSCCH (data) decoding completion timing is excessively delayed due to the delay of a start symbol location to which the 2nd SCI is mapped on the time domain and/or a case in which the (PSSCH) DMRS symbol number used for a channel estimation for the 2nd SCI decoding is insufficient). In addition, as an example, when the following (some) conditions are not satisfied, it may be interpreted that the 2nd SCI mapping/transmission based on the above described option (eg, Option A/B/C/D) is performed. In addition, as an example, what is applied among the above-described option (eg, Option A/B/C/D) may be configured differently according to whether the following (some) conditions are satisfied.

(1) when the number of PSSCH DMRS (symbol) is less than the preconfigured threshold (eg, 3) (and/or the number of PSSCH DMRS (symbol) (in one subchannel) remaining after truncation by PSCCH is less than a preconfigured threshold (eg, 2)), and/or (2) when the number of PSSCH symbols (in one subchannel) remaining after being truncated by the PSCCH (eg, PSSCH DMRS symbols and/or PSSCH non-DMRS symbols) is less than a preconfigured threshold value, and/or (3) when the (start) location of the PSSCH DMRS (earliest in time domain) (symbol) (and/or PSSCH symbol) remaining after truncation by the PSCCH (in one subchannel) is located in or behind the preconfigured (PSSCH symbol) critical position (eg, the last symbol of PSSCH), and/or (4) when the amount of PSSCH resources to which the 2nd SCI may be mapped remaining after truncation by the PSSCH (in one subchannel) is insufficient (compared to the (minimum) 2nd SCI resource amount required for supporting required (service) reliability) (or less than the preconfigured threshold) (alternatively, the PSSCH resource amount to which data may be mapped remaining after truncation by PSCCH is insufficient (compared to the (minimum) resource amount required for the packet transmission) (or less than the preconfigured threshold), and/or (5) when the PSFCH resource is configured in a resource pool (or is not configured), and/or (6) when (minimum or maximum or average) PSSCH symbol number (available for data transmission) (and/or SL SLOT symbol number (excluding the PSFCH symbol) (or minimum (or maximum or average) SL SLOT symbol number in a resource pool) and/or (selectable) (minimum or maximum or average) PSSCH DMRS symbol number and/or PSCCH symbol number) is less (or greater) than preconfigured threshold (or equal to the preconfigured value).

Figure 16:
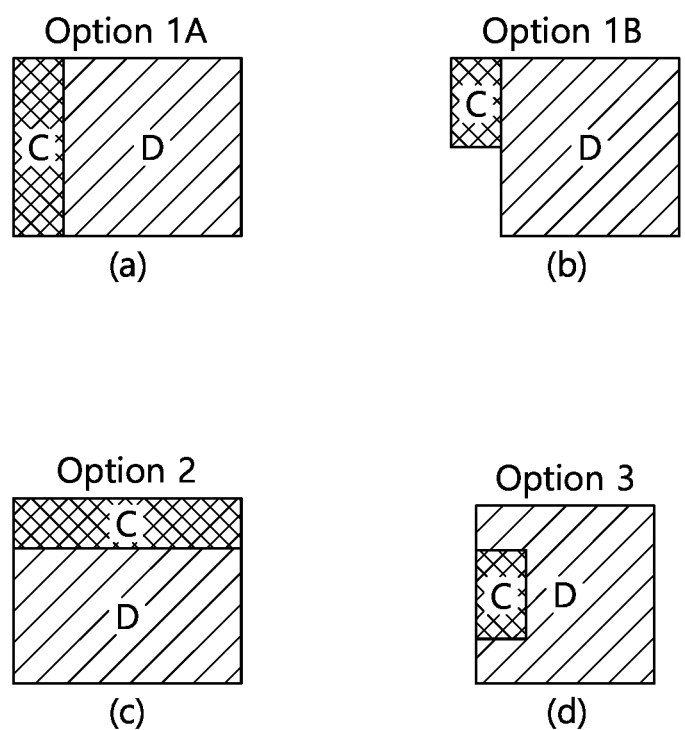
FIG. 16 shows examples for resource mapping relations of a PSCCH and a PSSCH.
Figure 16:
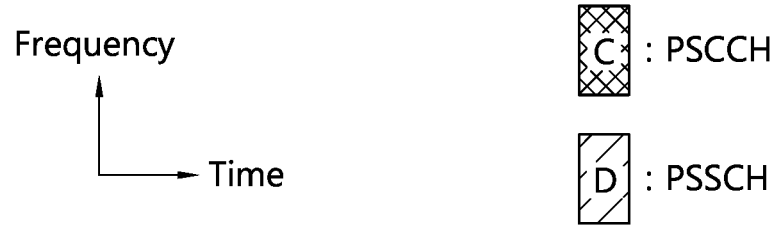

FIG. 16 shows examples for resource mapping relations of a PSCCH and a PSSCH.

Referring to (a) to (d) of FIG. 16, various embodiments in which TDM or FDM is performed to (a resource area for) PSCCH and (a resource area for) PSSCH are shown. In one example, (a) to (d) of FIG. 16 may be based on the description described in Table 5 below.

TABLE 5

RAN1 to continue study on multiplexing physical channels considering at least the above aspects:
  Multiplexing of PSCCH and the associated PSSCH (here, the "associated" means that the PSCCH at least carries information necessary to decode the PSSCH).
  Study further the following options:
    Option 1: PSCCH and the associated PSSCH are transmitted using non-overlapping time resources.
    Option 1A: The frequency resources used by the two channels are the same.
    Option 1B: The frequency resources used by the two channels can be different.
    Option 2: PSCCH and the associated PSSCH are transmitted using non-overlapping frequency resources in the all the time resources used for transmission. The time resources used by the two channels are the same.
    Option 3: A part of PSCCH and the associated PSSCH are transmitted using overlapping time resources in non-overlapping frequency resources, but another part of the associated PSSCH and/or another part of the PSCCH are transmitted using non-overlapping time resources.

As described in Table 5, Option 1A and Option 1B indicate that the PSCCH and the related PSSCH are transmitted in a state in which time resources do not overlap. Option 1A indicates a case in which the frequency resources used by the two channels are the same, and Option 1B indicates a case in which the frequency resources used by the two channels may be different. Option 2 indicates that the PSCCH and the related PSSCH are transmitted in a non-overlapping state on all time resources used for transmission. In Option 2, the time resource used by the two channels is the same. Option 3 represents that a part of the PSCCH and the related PSSCH are transmitted using overlapping time resources on non-overlapping frequency resources, and the remaining part of the related PSSCH and/or the remaining part of the PSCCH are transmitted using non-overlapping time resources.

In one embodiment, when PSCCH and PSSCH are multiplexed in the form of OPTION 3 below, the number of control channel frequency resources by which reasonable PSCCH and/or PSSCH coverage may be achieved may be derived based on a preconfigured number of reference data channel frequency resources. This may be interpreted as, for example, a ratio of the number of frequency resources of a data channel and/or a control channel to be FDMed is determined. In one example, if N times the number of reference data channel frequency resources are used for data channel transmission, it can be interpreted that the control channel-related PSD is increased by "10*LOG 2(N)".

Figure 17:
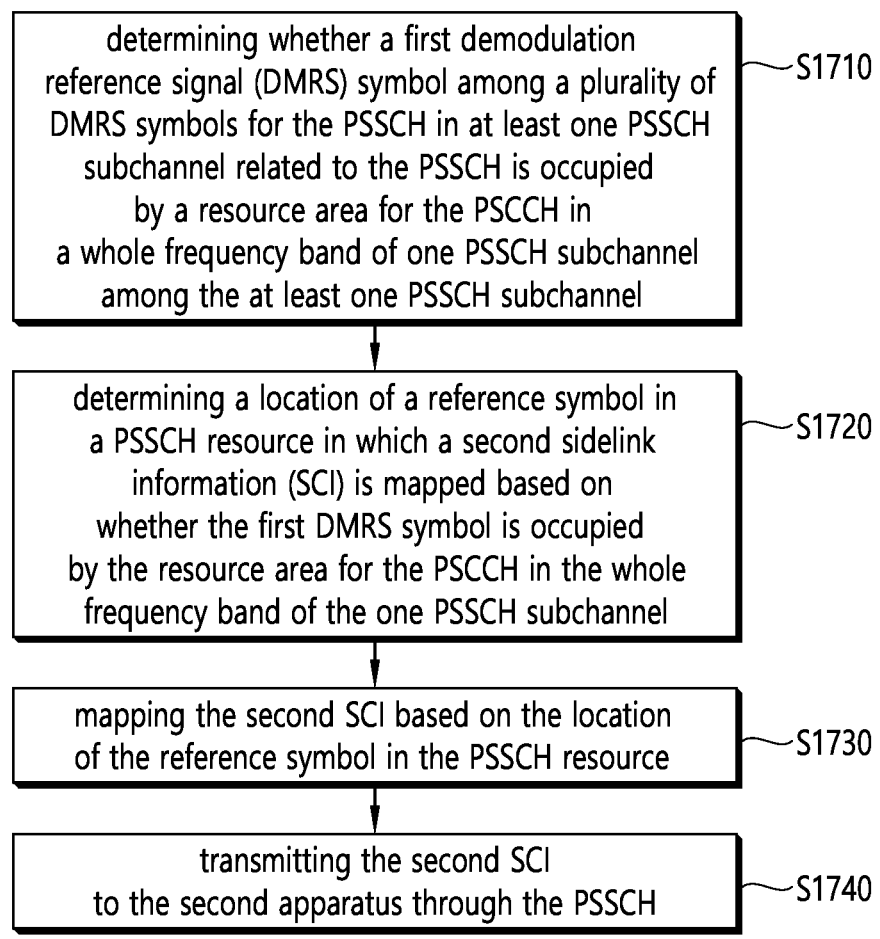
FIG. 17 shows an operation of a first apparatus according to an embodiment of the present disclosure.

FIG. 17 is a flowchart illustrating an operation of a first apparatus according to an embodiment of the present disclosure.

The operations disclosed in the flowchart of FIG. 17 may be performed in combination with various embodiments of the present disclosure. In one example, the operations disclosed in the flowchart of FIG. 17 may be performed based on at least one of the apparatuses illustrated in FIGS. 19 to 24.

In step S1710, the first apparatus according to an embodiment may determine whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel.

In step S1720, the first apparatus according to an embodiment may determine a location of a reference symbol in a PSSCH resource in which a second sidelink information (SCI) is mapped based on whether the first DMRS symbol is occupied by the resource area for the PSCCH in the whole frequency band of the one PSSCH subchannel.

In step S1730, the first apparatus according to an embodiment may map the second SCI based on the location of the reference symbol in the PSSCH resource.

In step S1740, the first apparatus according to an embodiment may transmit the second SCI to the second apparatus through the PSSCH.

In an embodiment, at least one resource element (RE) among a plurality of REs constituting one DMRS symbol among the plurality of DMRS symbols may be used for a DMRS transmission.

In an embodiment, the determining the location of the reference symbol in which the second SCI is mapped may include: determining the first DMRS symbol as the reference symbol based on that the first DMRS symbol for the PSSCH is not occupied by the resource area for the PSCCH in the whole frequency band of the one PSSCH subchannel.

In an embodiment, the at least one PSSCH subchannel may be two or more PSSCH subchannels in which frequency-division multiplexing is performed, the resource area for the PSCCH occupies a whole frequency band of a single lowest frequency PSSCH subchannel among the two or more PSSCH subchannels, and the determining the location of the reference symbol in which the second SCI is mapped may include: determining the first DMRS symbol as the reference symbol based on that the first DMRS symbol for the PSSCH is not occupied by the resource area for the PSSCH in a whole frequency band of at least one PSSCH subchannel among the two or more PSSCH subchannels, wherein FDM is performed to the at least one PSSCH subchannel with the single lowest frequency PSSCH subchannel.

In an embodiment, the at least one PSSCH subchannel may be a single PSSCH subchannel, the resource area for the PSCCH occupies a whole frequency band of the single PSSCH subchannel, and the determining the location of the reference symbol in which the second SCI is mapped may include: determining, the DMRS symbol for the PSSCH which is an initial symbol after an ending symbol of the resource area for the PSCCH, as the reference symbol based on that the first DMRS symbol for the PSSCH is occupied by the resource area for the PSCCH in the whole frequency band of the single PSSCH subchannel.

In an embodiment, the at least one PSSCH subchannel may be a single PSSCH subchannel, the resource area for the PSCCH occupies a whole frequency band of the single PSSCH subchannel, and the determining the location of the reference symbol in which the second SCI is mapped may include: determining an initial symbol after an ending symbol of the resource area for the PSCCH as the reference symbol based on that the first DMRS symbol for the PSSCH is occupied by the resource area for the PSCCH in the whole frequency band of the single PSSCH subchannel.

In an embodiment, the PSSCH may include a PSSCH for an N-th slot, a PSSCH for an N+1-th slot and a PSSCH for an N+2-th slot, the PSCCH may include a PSCCH for the N-th slot, a PSCCH for the N+1-th slot and a PSCCH for the N+2-th slot, and the PSSCH for the N-th slot may be related to the PSCCH for the N-th slot, and the PSSCH for the N+1-th slot is related to the PSCCH for the N+1-TH slot.

In an embodiment, whether to transmit an SL channel state information-reference signal (CSI-RS) related to the PSSCH for the N-th slot may be controlled by the PSCCH for the N-th slot, whether to transmit an SL CSI-RS related to the PSSCH for the N+1-th slot is controlled by the PSCCH for the N+1-th slot, and whether to transmit an SL CSI-RS related to the PSSCH for the N+2-th slot is controlled by the PSCCH for the N+2-th slot.

In an embodiment, the PSCCH may include first SCI, and the first SCI may include at least one of information on a time or frequency resource of the PSSCH, information, modulation and coding scheme (MCS) information required for decoding the PSSCH, or priority information on data on the PSSCH.

In an embodiment, the second SCI may include at least one of information on a source ID or a destination ID for data on the PSSCH, hybrid automatic repeat request (HARQ) process ID information, new data indicator (NDI), a field for CSI-RS transmission or redundancy version (RV).

According to an embodiment of the present disclosure, a first apparatus for transmitting a physical sidelink control channel (PSCCH) and a physical sidelink shared channel (PSSCH) to a second apparatus may be provided. The first apparatus may include: at least one memory storing instructions, at least one transceiver and at least one processor connecting the at least one memory and the at least one transceiver, wherein the at least one processor is configured to: determine whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel, determine a location of a reference symbol in a PSSCH resource in which a second sidelink information (SCI) is mapped based on whether the first DMRS symbol is occupied by the resource area for the PSCCH in the whole frequency band of the one PSSCH subchannel, map the second SCI based on the location of the reference symbol in the PSSCH resource, and control the at least one transceiver to transmit the second SCI to the second apparatus through the PSSCH.

According to an embodiment of the present disclosure, an apparatus (or a chip (set)) for controlling the first terminal may be provided. The apparatus may include: at least one processor and at least one computer memory operably coupled by the at least one processor and storing instructions, wherein, by the at least one processor executing the instructions, the first terminal is configured to: determine whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel, determine a location of a reference symbol in a PSSCH resource in which a second sidelink information (SCI) is mapped based on whether the first DMRS symbol is occupied by the resource area for the PSCCH in the whole frequency band of the one PSSCH subchannel, map the second SCI based on the location of the reference symbol in the PSSCH resource, and transmit the second SCI to a second terminal through the PSSCH.

According to an embodiment of the present disclosure, a non-transitory computer-readable storage medium storing instructions may be provided. Based on the instructions being executed by at least one processor of the non-transitory computer-readable storage medium: whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel is determined by a first apparatus, a location of a reference symbol in a PSSCH resource in which a second sidelink information (SCI) is mapped based on whether the first DMRS symbol is occupied by the resource area for the PSCCH in the whole frequency band of the one PSSCH subchannel is determined by the first apparatus, the second SCI is mapped by the first apparatus based on the location of the reference symbol in the PSSCH resource, and the second SCI is transmitted by the first apparatus to a second apparatus through the PSSCH.

FIG. 18 is a flowchart illustrating an operation of a second apparatus according to an embodiment of the present disclosure.

The operations disclosed in the flowchart of FIG. 18 may be performed in combination with various embodiments of the present disclosure. In one example, the operations disclosed in the flowchart of FIG. 18 may be performed based on at least one of the apparatuses illustrated in FIGS. 19 to 24.

In step S1810, the second apparatus according to an embodiment may receive second SCI transmitted by the first apparatus through the PSSCH.

In an embodiment, a mapping location in at least one PSSCH subchannel of the second SCI may be determined, in a whole frequency band of one PSSCH subchannel among the at least one PSCCH subchannel, based on a location of a reference symbol in a PSSCH resource which is based on whether a first DMRS symbol among a plurality of DMRS symbols is occupied by a resource area related to the PSCCH.

In an embodiment, at least one resource element (RE) among a plurality of REs constituting one DMRS symbol among the plurality of DMRS symbols may be used for a DMRS transmission.

In an embodiment, the determining the location of the reference symbol in which the second SCI is mapped may include: determining the first DMRS symbol as the reference symbol based on that the first DMRS symbol for the PSSCH is not occupied by the resource area for the PSCCH in the whole frequency band of the one PSSCH subchannel.

In an embodiment, the at least one PSSCH subchannel may be two or more PSSCH subchannels in which frequency-division multiplexing is performed, the resource area for the PSCCH occupies a whole frequency band of a single lowest frequency PSSCH subchannel among the two or more PSSCH subchannels, and the determining the location of the reference symbol in which the second SCI is mapped may include: determining the first DMRS symbol as the reference symbol based on that the first DMRS symbol for the PSSCH is not occupied by the resource area for the PSCCH in a whole frequency band of at least one PSSCH subchannel among the two or more PSSCH subchannels, wherein FDM is performed to the at least one PSSCH subchannel with the single lowest frequency PSSCH subchannel.

In an embodiment, the at least one PSSCH subchannel may be a single PSSCH subchannel, the resource area for the PSCCH occupies a whole frequency band of the single PSSCH subchannel, and the determining the location of the reference symbol in which the second SCI is mapped may include: determining, the DMRS symbol for the PSSCH which is an initial symbol after an ending symbol of the resource area for the PSCCH, as the reference symbol based on that the first DMRS symbol for the PSSCH is occupied by the resource area for the PSCCH in the whole frequency band of the single PSSCH subchannel.

In an embodiment, the at least one PSSCH subchannel may be a single PSSCH subchannel, the resource area for the PSCCH occupies a whole frequency band of the single PSSCH subchannel, and the determining the location of the reference symbol in which the second SCI is mapped may include: determining an initial symbol after an ending symbol of the resource area for the PSCCH as the reference symbol based on that the first DMRS symbol for the PSSCH is occupied by the resource area for the PSCCH in the whole frequency band of the single PSSCH subchannel.

In an embodiment, the PSSCH may include a PSSCH for an N-th slot, a PSSCH for an N+1-th slot and a PSSCH for an N+2-th slot, the PSCCH may include a PSCCH for the N-th slot, a PSCCH for the N+1-th slot and a PSCCH for the N+2-th slot, and the PSSCH for the N-th slot may be related to the PSCCH for the N-th slot, and the PSSCH for the N+1-th slot is related to the PSCCH for the N+1-TH slot.

In an embodiment, whether to transmit an SL channel state information-reference signal (CSI-RS) related to the PSSCH for the N-th slot may be controlled by the PSCCH for the N-th slot, whether to transmit an SL CSI-RS related to the PSSCH for the N+1-th slot is controlled by the PSCCH for the N+1-th slot, and whether to transmit an SL CSI-RS related to the PSSCH for the N+2-th slot is controlled by the PSCCH for the N+2-th slot.

In an embodiment, the PSCCH may include first SCI, and the first SCI may include at least one of information on a time or frequency resource of the PSSCH, information, modulation and coding scheme (MCS) information required for decoding the PSSCH, or priority information on data on the PSSCH.

In an embodiment, the second SCI may include at least one of information on a source ID or a destination ID for data on the PSSCH, hybrid automatic repeat request (HARQ) process ID information, new data indicator (NDI), a field for CSI-RS transmission or redundancy version (RV).

According to an embodiment of the present disclosure, a second apparatus for receiving a physical sidelink control channel (PSCCH) and a physical sidelink shared channel (PSSCH) from a first apparatus may be provided. The second apparatus may include at least one memory storing instructions, at least one transceiver and at least one processor connecting the at least one memory and the at least one transceiver, wherein the at least one processor is configured to: control the at least one transceiver to receive second SCI transmitted by the first apparatus through the PSSCH, wherein a mapping location in at least one PSSCH subchannel of the second SCI is determined, in a whole frequency band of one PSSCH subchannel among the at least one PSCCH subchannel, based on a location of a reference symbol in a PSSCH resource which is based on whether a first DMRS symbol among a plurality of DMRS symbols is occupied by a resource area related to the PSCCH.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
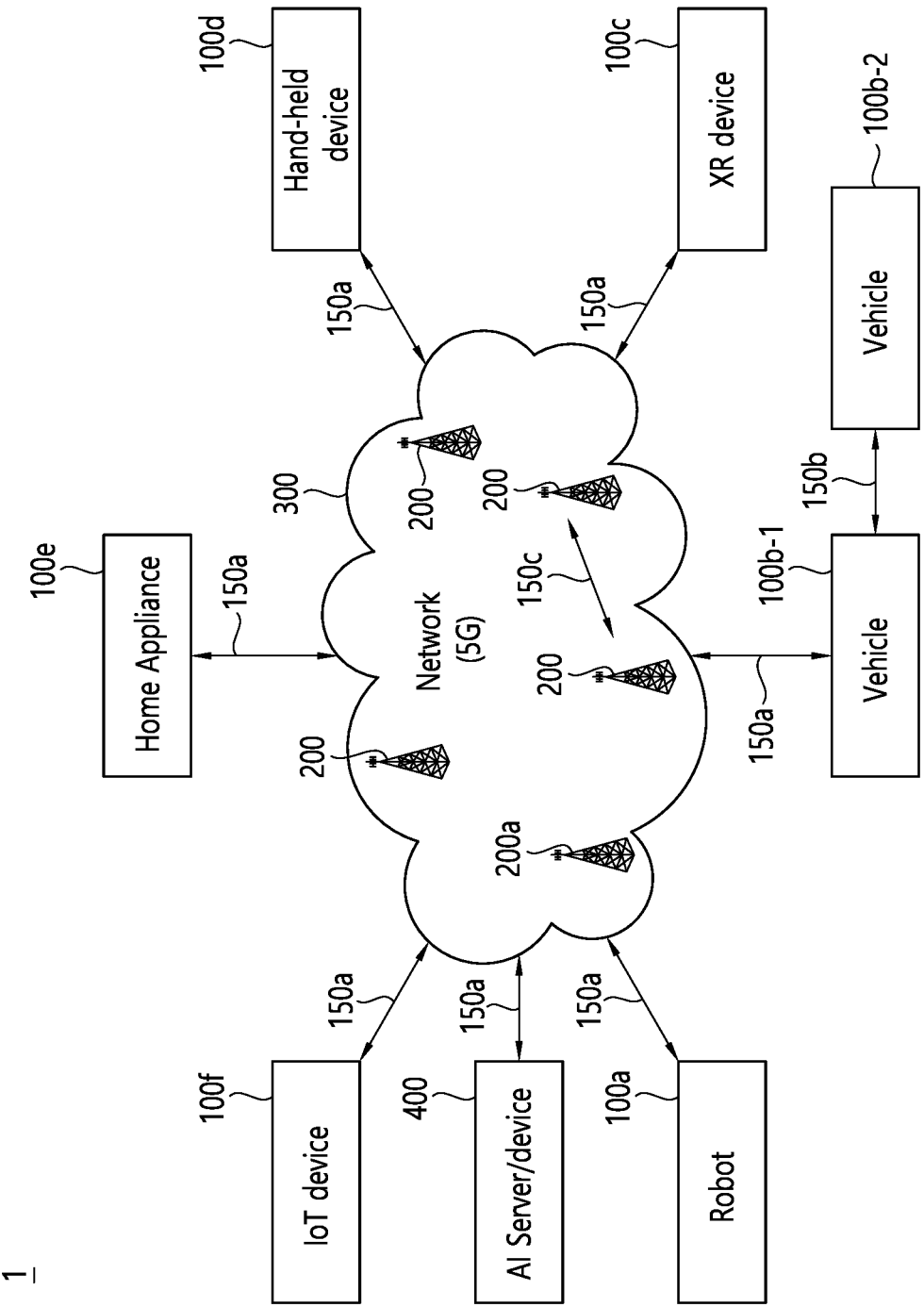
FIG. 19 shows a communication system 1 in accordance with an embodiment of the present disclosure.

FIG. 19 shows a communication system 1, in accordance with an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
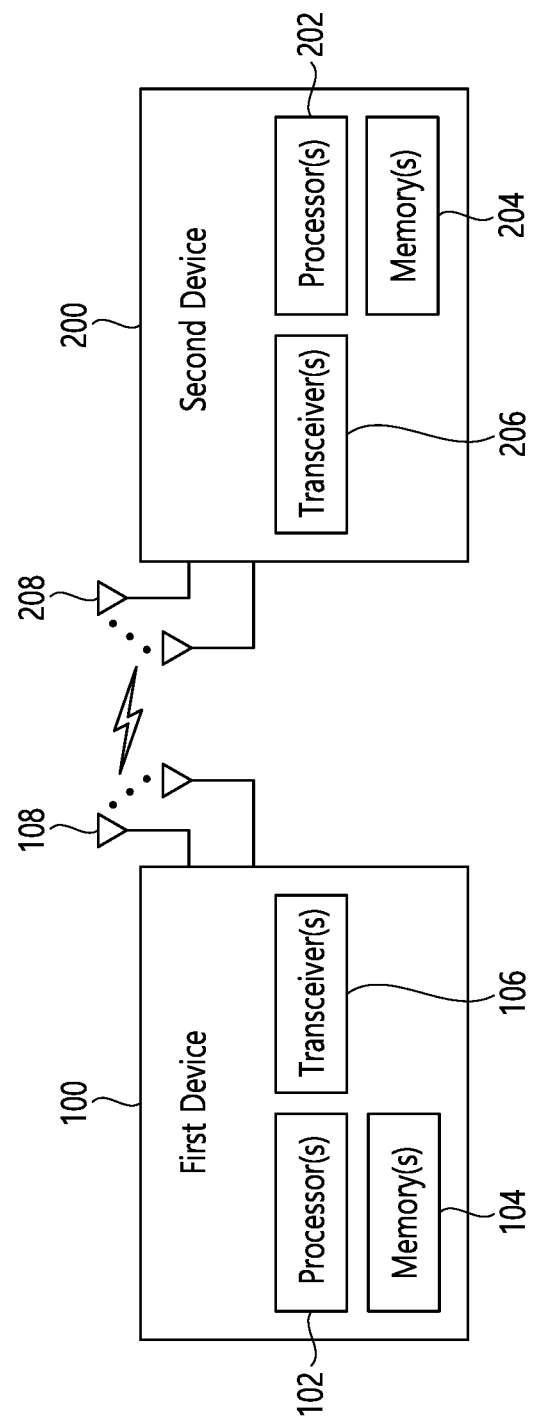
FIG. 20 shows wireless devices in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other apparatuses. The one or more transceivers 106 and 206 may receive user data, control information, and/or radio signals/channels, mentioned in the descriptions, functions, procedures, proposals, methods, and/or operational flowcharts disclosed in this document, from one or more other apparatuses. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other apparatuses. In addition, the one or more processors 102 and 202 may perform control so that the one or more transceivers 106 and 206 may receive user data, control information, or radio signals from one or more other apparatuses. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
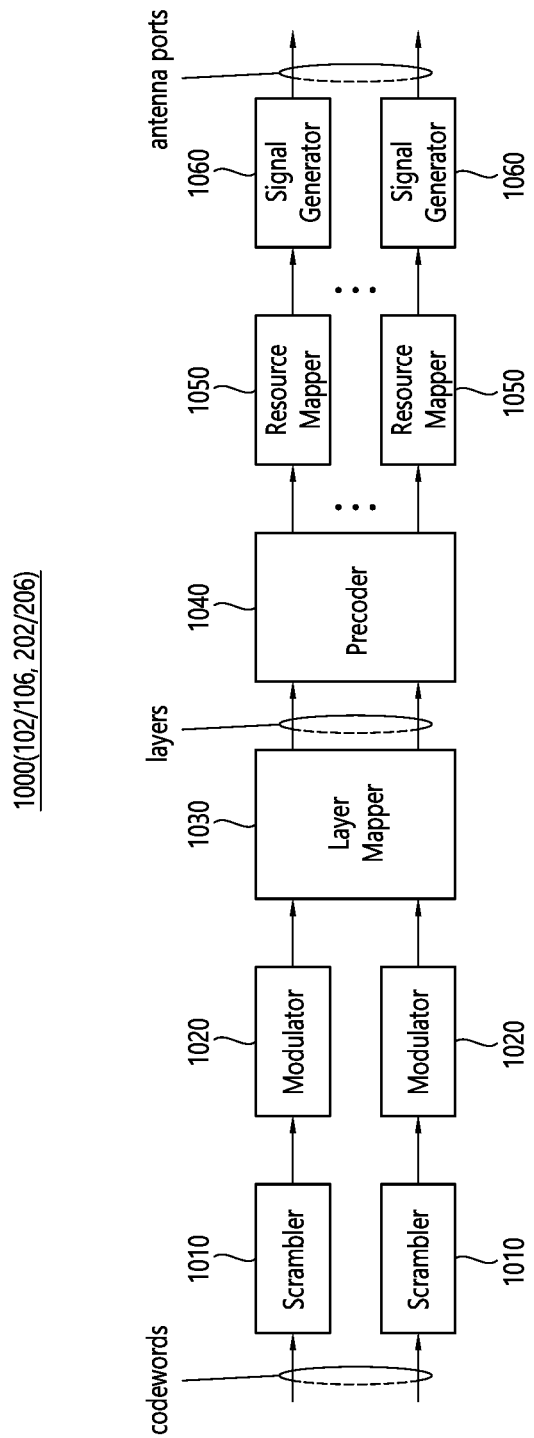
FIG. 21 shows a signal process circuit for a transmission signal in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed by, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
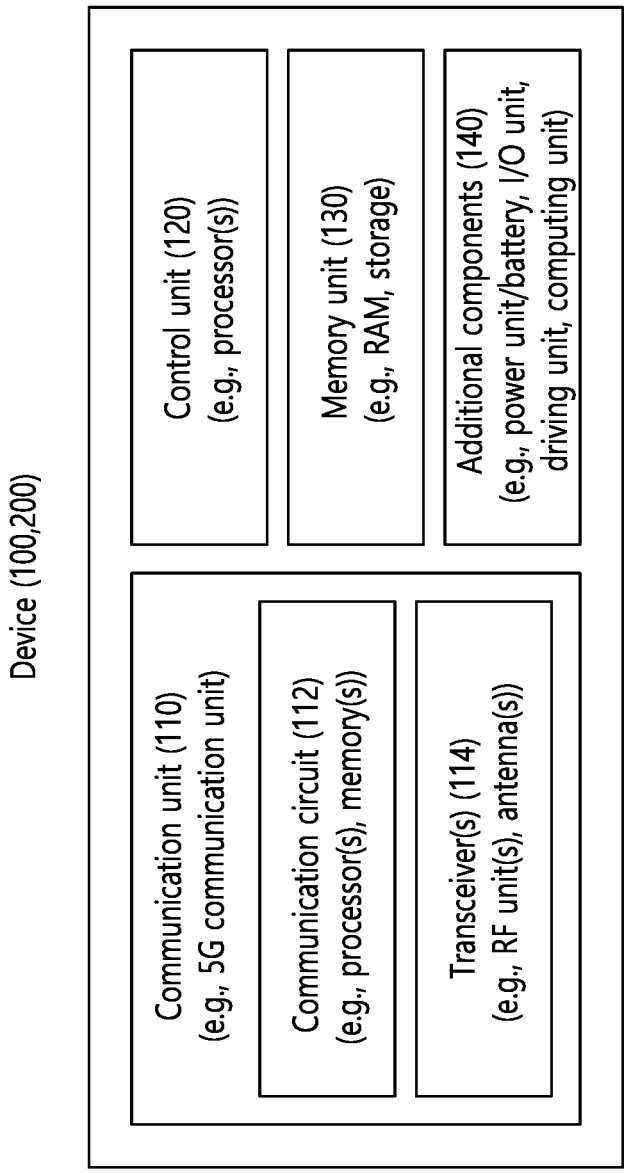
FIG. 22 shows a wireless device in accordance with an embodiment of the present disclosure.

FIG. 22 shows a wireless device, in accordance with an embodiment of the present disclosure. The wireless device may be implemented in various forms according to a use-case/service (see FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
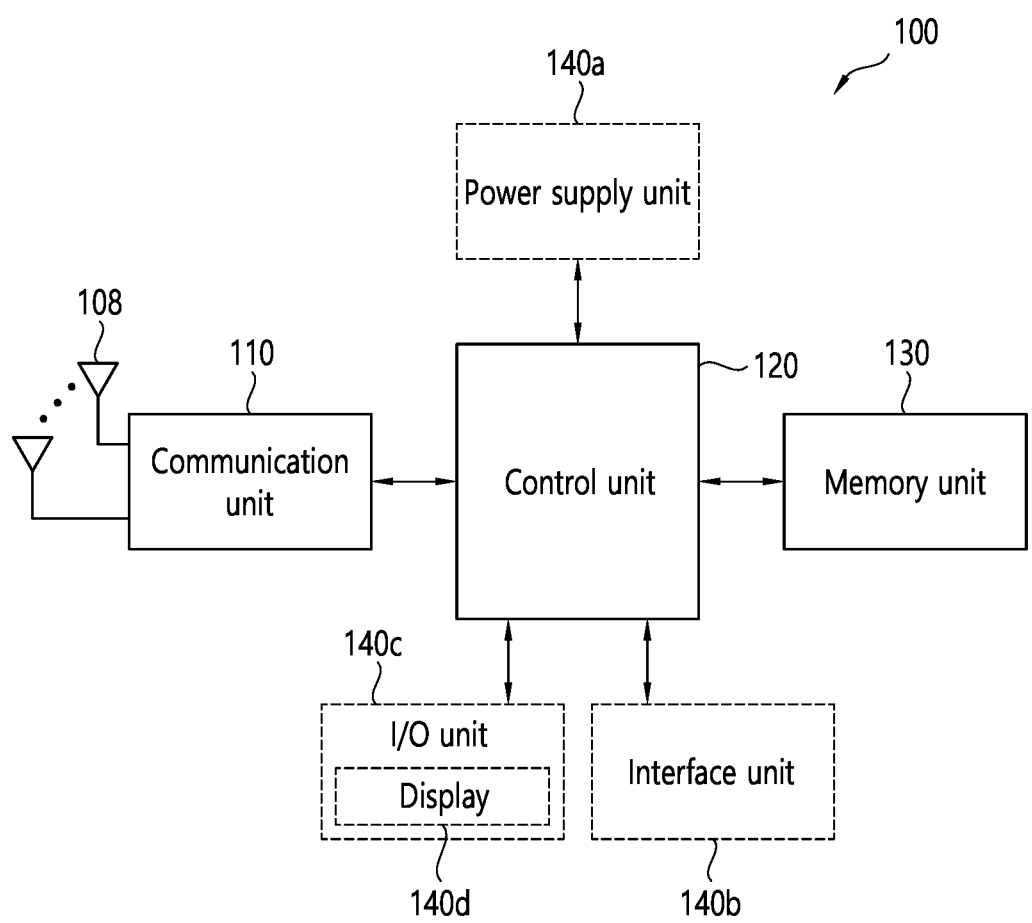
FIG. 23 shows a hand-held device in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
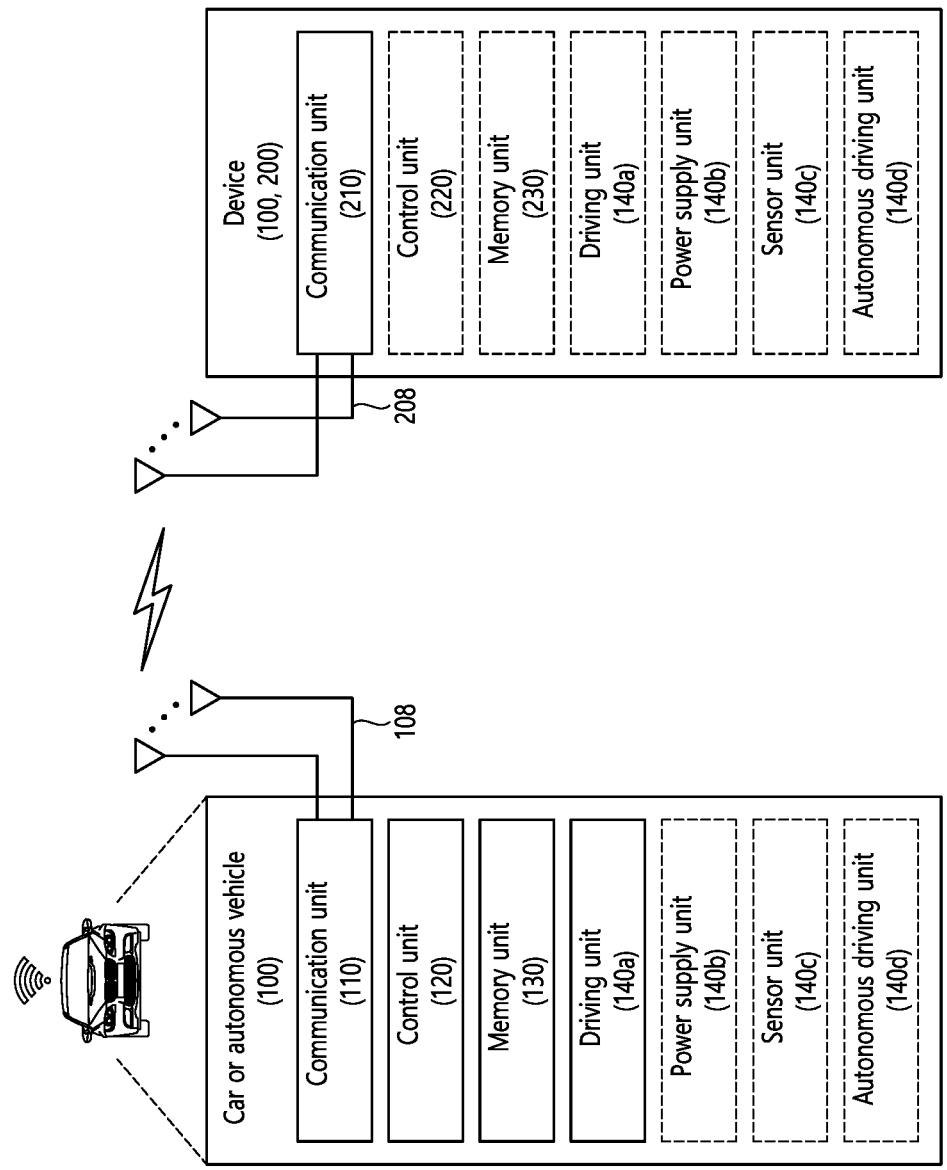
FIG. 24 shows a car or an autonomous vehicle in accordance with an embodiment of the present disclosure.

FIG. 24 shows a car or an autonomous vehicle, in accordance with an embodiment of the present disclosure. The car or autonomous vehicle may be implemented by a mobile robot, a car, a train, a manned/unmanned Aerial Vehicle (AV), a ship, etc.

Referring to FIG. 24, a car or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In addition, in the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for a first apparatus to transmit a physical sidelink control channel (PSCCH) and a physical sidelink shared channel (PSSCH) to a second apparatus, the method including:
   determining whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel;
   determining a location of a reference symbol in a PSSCH resource in which a second sidelink information (SCI) is mapped based on whether the first DMRS symbol is occupied by the resource area for the PSCCH in the whole frequency band of the one PSSCH subchannel;
   mapping the second SCI based on the location of the reference symbol in the PSSCH resource; and
   transmitting the second SCI to the second apparatus through the PSSCH.

2. The method of claim 1, wherein at least one resource element (RE) among a plurality of REs constituting one DMRS symbol among the plurality of DMRS symbols is used for a DMRS transmission.

3. The method of claim 1, wherein the determining the location of the reference symbol in which the second SCI is mapped includes:
   determining the first DMRS symbol as the reference symbol based on that the first DMRS symbol for the PSSCH is not occupied by the resource area for the PSCCH in the whole frequency band of the one PSSCH subchannel.

4. The method of claim 1, wherein the at least one PSSCH subchannel is two or more PSSCH subchannels in which frequency-division multiplexing is performed,
   wherein the resource area for the PSCCH occupies a whole frequency band of a single lowest frequency PSSCH subchannel among the two or more PSSCH subchannels, and
   wherein the determining the location of the reference symbol in which the second SCI is mapped includes:
   determining the first DMRS symbol as the reference symbol based on that the first DMRS symbol for the PSSCH is not occupied by the resource area for the PSSCH in a whole frequency band of at least one PSSCH subchannel among the two or more PSSCH subchannels, wherein FDM is performed to the at least one PSSCH subchannel with the single lowest frequency PSSCH subchannel.

5. The method of claim 1, wherein the at least one PSSCH subchannel is a single PSSCH subchannel,
   wherein the resource area for the PSCCH occupies a whole frequency band of the single PSSCH subchannel, and
   wherein the determining the location of the reference symbol in which the second SCI is mapped includes,
   determining, the DMRS symbol for the PSSCH which is an initial symbol after an ending symbol of the resource area for the PSCCH, as the reference symbol based on that the first DMRS symbol for the PSSCH is occupied by the resource area for the PSCCH in the whole frequency band of the single PSSCH subchannel.

6. The method of claim 1, wherein the at least one PSSCH subchannel is a single PSSCH subchannel,
   wherein the resource area for the PSCCH occupies a whole frequency band of the single PSSCH subchannel, and
   wherein the determining the location of the reference symbol in which the second SCI is mapped includes:
   determining an initial symbol after an ending symbol of the resource area for the PSCCH as the reference symbol based on that the first DMRS symbol for the PSSCH is occupied by the resource area for the PSCCH in the whole frequency band of the single PSSCH subchannel.

7. The method of claim 1, wherein the PSSCH includes a PSSCH for an N-th slot, a PSSCH for an N+1-th slot and a PSSCH for an N+2-th slot,
   wherein the PSCCH includes a PSCCH for the N-th slot, a PSCCH for the N+1-th slot and a PSCCH for the N+2-th slot, and
   wherein the PSSCH for the N-th slot is related to the PSCCH for the N-th slot, and the PSSCH for the N+1-th slot is related to the PSCCH for the N+1-TH slot.

8. The method of claim 7, wherein, whether to transmit an SL channel state information-reference signal (CSI-RS) related to the PSSCH for the N-th slot is controlled by the PSCCH for the N-th slot,
   wherein, whether to transmit an SL CSI-RS related to the PSSCH for the N+1-th slot is controlled by the PSCCH for the N+1-th slot, and
   wherein, whether to transmit an SL CSI-RS related to the PSSCH for the N+2-th slot is controlled by the PSCCH for the N+2-th slot.

9. The method of claim 1, wherein the PSCCH includes first SCI, and
   wherein the first SCI includes at least one of information on a time or frequency resource of the PSSCH, information, modulation and coding scheme (MCS) information required for decoding the PSSCH, or priority information on data on the PSSCH.

10. The method of claim 1, wherein the second SCI includes at least one of information on a source ID or a destination ID for data on the PSSCH, hybrid automatic repeat request (HARQ) process ID information, new data indicator (NDI), a field for CSI-RS transmission or redundancy version (RV).

11. A first apparatus for transmitting a physical sidelink control channel (PSCCH) and a physical sidelink shared channel (PSSCH) to a second apparatus, the first apparatus comprising:
   at least one memory to store instructions;
   at least one transceiver; and
   at least one processor to connect the at least one memory and the at least one transceiver,
   wherein the at least one processor is configured to:
   determine whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel,
   determine a location of a reference symbol in a PSSCH resource in which a second sidelink information (SCI) is mapped based on whether the first DMRS symbol is occupied by the resource area for the PSCCH in the whole frequency band of the one PSSCH subchannel, map the second SCI based on the location of the reference symbol in the PSSCH resource, and control the at least one transceiver to transmit the second SCI to the second apparatus through the PSSCH.

12. The method of claim 11, wherein at least one resource element (RE) among a plurality of REs constituting one DMRS symbol among the plurality of DMRS symbols is used for DMRS transmission.

13. An apparatus for controlling a first terminal, the apparatus comprising:

at least one processor; and at least one computer memory that is connected to be executable by the at least one processor and stores instructions, wherein, when the at least one processor executes the instructions, the first terminal is configure to:

determine whether a first demodulation reference signal (DMRS) symbol among a plurality of DMRS symbols for the PSSCH in at least one PSSCH subchannel related to the PSSCH is occupied by a resource area for the PSCCH in a whole frequency band of one PSSCH subchannel among the at least one PSSCH subchannel, determine a location of a reference symbol in a PSSCH resource in which a second sidelink information (SCI) is mapped based on whether the first DMRS symbol is occupied by the resource area for the PSCCH in the whole frequency band of the one PSSCH subchannel, map the second SCI based on the location of the reference symbol in the PSSCH resource, and transmit the second SCI to a second terminal through the PSSCH.

* * * * *